US007423078B2

(12) United States Patent
Ono

(10) Patent No.: US 7,423,078 B2
(45) Date of Patent: Sep. 9, 2008

(54) ORGANIC-INORGANIC HYBRID MATERIAL, ORGANIC-INORGANIC HYBRID PROTON-CONDUCTIVE MATERIAL AND FUEL CELL

(75) Inventor: Michio Ono, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 628 days.

(21) Appl. No.: 10/672,190

(22) Filed: Sep. 26, 2003

(65) Prior Publication Data

US 2005/0100772 A1 May 12, 2005

(30) Foreign Application Priority Data

Sep. 26, 2002 (JP) ............................. 2002-281356
Sep. 26, 2002 (JP) ............................. 2002-281357
Sep. 30, 2002 (JP) ............................. 2002-286894

(51) Int. Cl.
*H01M 8/00* (2006.01)
*C08K 5/36* (2006.01)

(52) U.S. Cl. ................. 524/115; 524/165; 524/157; 525/100; 526/279; 429/33; 429/46

(58) Field of Classification Search ............... 526/279; 525/100; 524/115, 165, 157; 429/46, 33
See application file for complete search history.

(56) References Cited

U.S. PATENT DOCUMENTS

| 4,388,453 | A | | 6/1983 | Finkelmann et al. | |
|---|---|---|---|---|---|
| 4,730,904 | A | * | 3/1988 | Pauluth et al. | 349/131 |
| 4,835,076 | A | * | 5/1989 | Heinze et al. | 429/213 |
| 5,174,867 | A | * | 12/1992 | Naarmann et al. | 205/419 |
| 5,211,877 | A | | 5/1993 | Andrejewski et al. | |
| 5,243,004 | A | * | 9/1993 | Funatsu et al. | 526/256 |

FOREIGN PATENT DOCUMENTS

| EP | 1223632 A2 | 7/2002 |
|---|---|---|
| JP | S62-030123 | 2/1987 |
| JP | 2000-090946 | 3/2000 |
| JP | 2000-178285 | 6/2000 |

OTHER PUBLICATIONS

Preliminary communication—A new route for the preparation of liquid crystalline polyorganosiloxanes containing laterally linked mesogenic units on the main chains, Guo et al., Liquid Crystals, 2002, vol. 29, No. 9, pp. 1247-1250.

* cited by examiner

*Primary Examiner*—Margaret G Moore
(74) *Attorney, Agent, or Firm*—Sughrue Mion, PLLC

(57) ABSTRACT

An organic-inorganic hybrid material produced by crosslinking a precursor that is an organosilicon compound having a mesogen group is disclosed. The organic-inorganic hybrid material is favorable for electrolytic membranes for fuel cells.

30 Claims, 1 Drawing Sheet

ORGANIC-INORGANIC HYBRID MATERIAL, ORGANIC-INORGANIC HYBRID PROTON-CONDUCTIVE MATERIAL AND FUEL CELL

This application claims priority to Japanese Application No. 281356/2002 filed Sep. 26, 2002; Japanese Application No. 281357/2002 filed Sep. 26, 2002; and Japanese Application No. 286894/2002 filed Sep. 30, 2002, the entire contents of each are incorporated herein by reference.

BACKGROUND OF THE INVENTION

1. Field of the Invention

The present invention relates to an organic-inorganic hybrid material used as an optically-anisotropic material, to a proton-conductive material utilized in energy devices and electrochemical sensors, and to a fuel cell.

2. Description of the Background

Recently, a direct methanol fuel cell (DMFC) has been proposed, in which methanol is used in place of hydrogen for fuel. This is expected to give high-capacity batteries for mobile devices that are substitutable for lithium secondary batteries, and is now much studied in the art.

The important functions of the electrolytic membrane (proton-conductive membrane) for solid polymer fuel cells are to physically insulate the fuel (e.g., hydrogen, aqueous methanol solution) fed to the anode, catalyst electrode from the oxidizing gas (e.g., oxygen) fed to the cathode, to electrically insulate the anode from the cathode, and to transmit the proton having been formed on the anode to the cathode. To fulfill these functions, the electrolytic membrane must have some mechanical strength and high proton conductivity.

In the electrolytic membrane for solid polymer fuel cells, generally used is a sulfonic acid group-having perfluorocarbon polymer such as typically Nafion®. The electrolytic membrane of the type has good ionic conductivity and has relatively high mechanical strength, but has some problems to be solved such as those mentioned below. Concretely, in the electrolytic membrane, water and the sulfonic acid group contained in the membrane form cluster channels, and protons move in the cluster channels via water therein. Therefore, the ionic conductivity of the membrane significantly depends on the water content thereof that is associated with the humidity in the service environment in which the cells are driven. For poisoning reduction in the catalyst electrode with CO and for activation of the catalyst electrode therein, solid polymer fuel cells are preferably driven at a temperature falling within a range of from 100 to 150° C. However, within such a middle-temperature range, the water content of the electrolytic membrane in the cells lowers with the reduction in the ionic conductivity thereof, and the expected cell characteristics could not be obtained. In addition, the softening point of the electrolytic membrane is around 120° C. and when the cells are driven at a temperature around it, then the mechanical strength of the electrolytic membrane is unsatisfactory.

On the other hand, when the electrolytic membrane of the type is used in DMFC, then it leads to the following phenomenon. Naturally, the membrane readily absorbs water and its barrier ability against the fuel methanol is not good. Therefore, methanol having been fed to the anode penetrates through the electrolytic membrane to reach the cathode. Owing to it, the cell output power lowers, and this causes a methanol-crossover phenomenon. For practical use of DMFC, this is one important problem to be solved.

Given that situation, there is a growing tendency for the development of other proton-conductive membranes substitutable for Nafion®, and some hopeful electrolytic materials have been proposed. For inorganic proton-conductive material, for example, known is proton-conductive glass. This is obtained through polymerization of tetraalkoxysilane in the presence of acid in a sol-gel process, and it is known that its humidity dependency is low in a high-temperature range. However, it is not flexible and is extremely brittle, and large-area membranes are difficult to produce from it. Therefore, the material is unsuitable for electrolytes for fuel cells.

For easy film formation based on the good characteristics of in organic material, one proposal is a nano composite material hybridized with polymer material. For example, there is proposed is a method of forming a proton-conductive membrane by hybridizing a polymer compound having a sulfonic acid group in the side branches, a silicon oxide and a proton acid (for example, see JP-A 10-69817, pp. 4-7; JP-A11-203936, pp. 6-10; JP-A 2001-307752, pp. 6-7). Another proposal is an organic-inorganic nanohybrid proton-conductive material that is obtained through sol-gel reaction of a precursor, organic silicon compound in the presence of a proton acid (for example, see Japanese Patent 3,103,888, pp. 4-7).

These organic-inorganic composite and hybrid proton-conductive materials comprise an inorganic component and an organic component, in which the inorganic component comprises silicic acid and proton acid and serves as a proton-conductive site and the organic component serves to make the materials flexible. When the inorganic component is increased so as to increase the proton conductivity of the membranes formed of the material, then the mechanical strength of the membranes lowers. On the other hand, however, when the inorganic component is increased so as to increase the flexibility of the membranes, then the proton conductivity of the membranes lowers. Therefore, the materials that satisfy both of the two characteristics are difficult to obtain. Regarding the methanol perviousness of the materials, which is an important characteristic of the materials for use in DMFC, satisfactory description is not found in the related literature.

JP-A 2003-157863 and EP 1223632 A1 disclose a hydrolyzable silyl group-having carbon atom-containing compound of the following formula, which is for proton-conductive membranes.

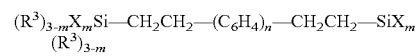

wherein $R^3$ represents a group selected from $CH_3$, $C_2H_5$ and $C_6H_5$; X represents a group selected from Cl, $OCH_3$, $OC_2H_5$ and $OC_6H_5$; m indicates a natural number of at most 3.

JP-A2002-42550 describes a method of forming an in-plane oriented silica (silicon dioxide, $SO_2$) meso-structure through sol-gel reaction of a silica precursor such as tetraalkoxysilane or tetrachlorosilane in a surfactant-containing solution. According to this, however, the inorganic component (silica) aggregates in the structure formed, and flexible membranes are difficult to produce.

Liquid crystal polyorganosiloxanes containing laterally linked mesogenic units on the main chains are described in Liquid Crystals, 2002, 29, 9, 1247-1250.

The present invention is to solve the problems noted above. Specifically, the first object of the invention is to provide a novel organic-inorganic hybrid material; the second object is to obtain a highly heat-resistant, proton-conductive membrane favorable for fuel cells; and the third object is to provide a proton-conductive membrane resistant to high-concentration methanol and having low methanol perviousness favorably for DMFC, and to provide a fuel cell that comprises it.

SUMMARY OF THE INVENTION

Taking the objects mentioned above into consideration, we, the present inventors have assiduously studied and, as a result, have found that, when a mesogen group is introduced into an organosilicon compound, a precursor for sol-gel reaction to thereby make the compound have the ability of orientation, then an organic-inorganic nanohybrid material can be constructed by the use of the compound and, in the nanohybrid material, a component that contains silicic acid-proton acid to be a pathway for proton conduction is formed in the direction that crosses the plane of a membrane of the material. On the basis of this finding, we have reached the present invention.

The first organic-inorganic hybrid material of the invention is produced by three-dimensionally crosslinking a mesogen group-having organosilicon compound, containing organic and inorganic proton sources of at least one each. This is so constructed that at least a part of the organic molecular chain thereof is oriented in one direction to form an aggregate. Concretely, the organosilicon compound for it is processed to have a mesogen and an alkyl group preferably having at least 4 carbon atoms, introduced thereinto, and this is subjected to sol-gel reaction through which the organic molecular chains of the compound are self-aligned, and the compound is thereby three-dimensionally crosslinked to be optically anisotropic. One preferred embodiment of the first organic-inorganic hybrid material of the invention is obtained through polymerization of an organosilicon compound of formula (1-1):

$$A^1\text{-}[Si(X^1)_{3-m11}(R^{11})_{m11}]_{n11} \quad (1\text{-}1)$$

In formula (1-1), $A^1$ represents an organic atomic group that contains a mesogen group and an alkylene group having at least 4 carbon atoms; $R^{11}$ represents an alkyl group, an aryl group or a heterocyclic group; $X^1$ represents a halogen atom or $OR^{14}$; $R^{14}$ represents a hydrogen atom, an alkyl group, an aryl group or a silyl group; m11 indicates an integer of from 0 to 2; n11 indicates an integer of from 1 to 10; when m11 or 3-m11 is 2 or more, then $R^{11}$'s or $X^1$'s may be the same or different.

In formula (1-1), $X^1$ is preferably an alkoxy group ($OR^{14}$, in which $R^{14}$ is an alkyl group). Also preferably, m11 is 0, and n11 is an integer of from 1 to 4. Also preferably, $A^1$ in formula (1-1) contains an alkyl or alkylene group having at least 5 carbon atoms.

When observed with a polarizing microscope, the organic-inorganic hybrid material obtained through sol-gel reaction of the precursor, compound of formula (1-1) is found to be optically anisotropic. This means that, in at least a certain region of the material, the organic component is oriented in a constant direction. In this material, the three-dimensional structure of Si—O—Si is inevitably continuously formed in the direction perpendicular to the long axis direction of the organic molecules.

The second organic-inorganic hybrid material of the invention is produced by three-dimensionally crosslinking a precursor, organosilicon compound that has an alkoxysilyl group, a mesogen group and a substituent group capable of forming a carbon-carbon bond or a carbon-oxygen bond through polymerization.

The precursor is preferably a compound of the following formula (2-1):

$$(R^{23})_{n22}\text{-}A^2\text{-}[Si(OR^{21})_{3-m21}(R^{22})_{m21}]_{n21} \quad (2\text{-}1)$$

In formula (2-1), $A^2$ represents an organic atomic group containing a mesogen group; $R^{21}$ represents an alkyl group; $R^{22}$ represents an alkyl group, an aryl group or a heterocyclic group; $R^{23}$ represents a substituent group capable of forming a carbon-carbon bond or a carbon-oxygen bond through polymerization; m21 indicates an integer of from 0 to 2; n21 indicates an integer of from 1 to 10; n22 indicates an integer of from 1 to 5; when 3-m21 or m21 is 2 or more, then $R^{21}$'s or $R^{22}$'s may be the same or different; when n 22 is 2 or more, then $R^{23}$'s may be the same or different.

In formula (2-1), $R^{23}$ is preferably a substituent group selected from an acryloyl group, a methacryloyl group, a vinyl group, an ethynyl group and oxirane group; m21 is preferably 0; n21 is preferably an integer of from 1 to 3; n22 is preferably an integer of from 1 to 3. Also preferably, $A^2$ contains an alkyl or alkylene group having at least 5 carbon atoms.

The organic-inorganic hybrid material that is obtained through sol-gel reaction of the precursor, compound of formula (2-1) combined with polymerization of the substituent therein capable of forming a carbon-carbon bond or a carbon-oxygen bond shows optical anisotropy, when observed with a polarizing microscope. This confirms that the organic component is oriented in the in-plane direction of the material, and therefore the inorganic network formed in the material is oriented in the direction crossing the in-plane direction.

The third organic-inorganic hybrid material of the invention is produced through crosslinking polymerization of a precursor, polymer compound having, in the side branches thereof, an atomic group that contains an alkoxysilyl group, a mesogen group and an alkylene group.

Preferably, the precursor to give the organic-inorganic hybrid material is a polymer compound having a repeating unit of the following formula (3-1):

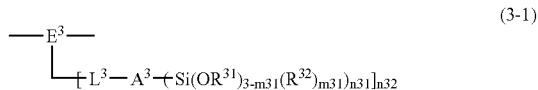

In formula (3-1), $A^3$ represents an organic atomic group that contains a mesogen group and an alkylene group; $R^{31}$ represents an alkyl group; $R^{32}$ represents an alkyl group, an aryl group or a heterocyclic group; $E^3$ represents an alkyleneoxy group, an alkylene group or a siloxy group; $L^3$ represents a linking group; m31 indicates an integer of from 0 to 2; n31 indicates an integer of from 1 to 10; n32 indicates an integer of from 1 to 5; when 3-m31 or m31 is 2 or more, then $R^{31}$'s or $R^{32}$'s may be the same or different.

The organic-inorganic hybrid material that is obtained through sol-gel reaction with acid of the precursor, polymer compound of formula (3-1) shows optical anisotropy, when observed with a polarizing microscope. This confirms that the organic component is oriented in the in-plane direction of the material, and therefore the inorganic network formed in the material is oriented in the direction crossing the in-plane direction.

In the first to third organic-inorganic hybrid materials, the mesogen group is preferably derived from a compound of the following formula (1-2):

$$\text{-}[Q^{11}\text{-}Y^{11}\text{-}Q^{12}]_{m12} \quad (1\text{-}2)$$

In formula (1-2), $Q^{11}$ and $Q^{12}$ each represent a divalent linking group or a single bond; $Y^{11}$ represents a divalent, 4-, 5-, 6- or 7-membered ring residue, or a condensed ring residue composed of such rings; m12 indicates an integer of from 1 to 3.

The inventors have further found that, when a proton donor is added to the first to third organic-inorganic hybrid material of the invention, then the resulting materials may be proton-conductive materials having better characteristics. The proton donor assists the formation of more effective proton-conductive pathways that continue on the molecular level with no aggregation of the three-dimensional crosslinked part of Si—O—Si in the inorganic region of the materials. The proton conductivity donor added to the materials is localized in the three-dimensional crosslinked part of Si—O—Si. Specifically, the inventors have found that, when a compound having a mesogen but not forming a three-dimensional crosslinking bond of Si—O—Si is added to the first to third organic-inorganic hybrid materials of the invention, then the resulting materials may form more flexible membranes that are more plastic and more resistant to methanol. For example, the first to third organic-inorganic hybrid materials of the invention may contain from 1 to 50 mol %, relative to the organosilicon compound, of a compound of the following formula (1-4) and/or a compound of the following formula (1-5):

(1-4)

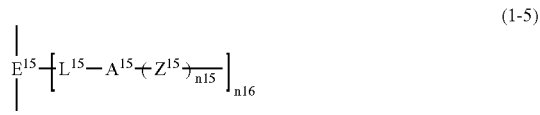

(1-5)

In formula (1-4), $A^{14}$ represents an organic atomic group that contains a mesogen and an alkylene group having at least 4 carbon atoms; $Z^{14}$ represents a substituent not changing in sol-gel reaction, or a hydrogen atom; n13 indicates an integer of from 1 to 8; n14 indicates an integer of from 0 to 4; $Y^{14}$ represents a polymerizing group that may form a carbon-carbon bond or a carbon-oxygen bond through polymerization; when n13 is 2 or more, then $Z^{14}$ may be the same or different.

In formula (1-5), $A^{15}$ represents an organic atomic group that contains a mesogen and an alkylene group having at least 4 carbon atoms; $Z^{15}$ represents a substituent not changing in sol-gel reaction, or a hydrogen atom; n15 indicates an integer of from 1 to 8; n16 indicates an integer of from 1 to 5; $L^{15}$ represents a linking group; $E^{15}$ represents an alkyleneoxy group, an alkylene group or a siloxy group; when n15 is 2 or more, then $Z^{15}$—s may be the same or different; when n16 is 2 or more, then the constitutive units may be the same or different.

The organic-inorganic hybrid proton-conductive material of the invention contains the organic-inorganic hybrid material of the invention and a proton source which imparts proton conductivity into the organic-inorganic hybrid material. Preferably, the proton source is at least one of phosphorus compounds, organic sulfonic acids and perfluorocarbonsulfonic acid polymers. The organic-inorganic hybrid proton-conductive material of the type is favorable for electrolytic membranes for fuel cells.

DETAILED DESCRIPTION OF THE PREFERRED EMBODIMENTS

Figure 1:
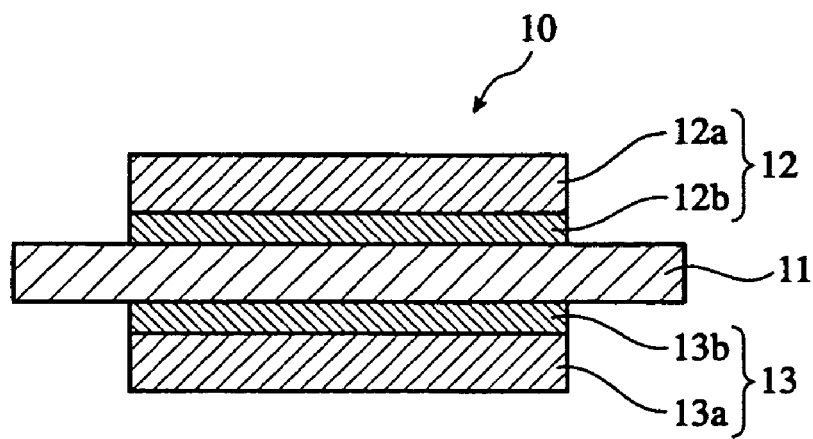
FIG. 1 is a cross-sectional view showing a membrane electrode assembly that comprises the organic-inorganic hybrid proton-conductive material of the invention.

The organic-inorganic hybrid material, organic-inorganic hybrid proton-conductive material and fuel cell are described-below in detail. It should now be noted that, in this specification, any notation using a word "to" indicates a range defined by values placed before and after such word, where both ends of such range are included as minimum and maximum values. In the present invention, an organic-inorganic hybrid material means a material comprising organic parts (moieties) and inorganic parts (moieties) in which the organic parts and the inorganic parts are connected by covalent bonds.

[1] Organosilicon Compound Precursor:

The first organic-inorganic hybrid material of the invention is produced by three-dimensionally crosslinking an organosilicon compound that has a mesogen group, and it contains at least one organic or inorganic proton source. Especially preferably, it is so constructed that at least a part of the organic molecular chains in the proton-conductive material form aggregates that are oriented in one direction.

More concretely, the organic-inorganic hybrid material is produced through polymerization of an organosilicon compound of formula (1-1):

(1-1)

In formula (1-1), $R^{11}$ represents an alkyl group, an aryl group or a heterocyclic group. Preferred example of the alkyl group are a linear, branched or cyclic alkyl group (having from 1 to 20 carbon atoms, such as methyl, ethyl, isopropyl, n-butyl, 2-ethylhexyl, n-decyl, cyclopropyl, cyclohexyl, cyclododecyl). Preferred examples of the aryl group are a substituted or unsubstituted phenyl group having from 6 to 20 carbon atoms, and a substituted or unsubstituted naphthyl group having from 10 to 20 carbon atoms. Preferred examples of the heterocyclic group are substituted or unsubstituted 6-membered hetero rings (e.g., pyridyl, morpholino), and substituted or unsubstituted 5-membered hetero rings (e.g., furyl, thiophene).

$X^1$ represents a halogen atom (e.g., chlorine, bromine, iodine), or $OR^{14}$, and $R^{14}$ represents a hydrogen atom, an alkyl group, an aryl group or a silyl group. For the preferred examples of the alkyl group and the aryl group for $R^{14}$, referred to are those mentioned hereinabove for the alkyl group and the aryl group for $R^{11}$. Preferred examples of the silyl group are a silyl group substituted with three groups selected from alkyl groups having from 1 to 10 carbon atoms (e.g., trimethylsilyl, triethylsilyl, triisopropylsilyl), and a polysiloxane group (e.g., —(Me$_2$SiO)$_n$H, where n is from 10 to 100). m11 indicates an integer of from 0 to 2, and n11 indicates an integer of from 1 to 10. When m11 or 3-m11 is 2 or more, then $R^{11}$'s or $X^1$'s may be the same or different.

In formula (1-1), $X^1$ is preferably an alkoxy group ($OR^{14}$, in which $R^{14}$ is an alkyl group). Also preferably, m11 is 0, and n 11 is an integer of from 1 to 4. $A^1$ represents an organic atomic group that contains a mesogen group and an alkylene group having at least 4 carbon atoms. Preferred examples of the mesogen group are described in Dietrich Demus & Horst Zaschke, *Flussige Kristalle in Tabelen II*, 1984, pp. 7-18. Those of the following formula (1-2) are especially preferred:

(1-2)

In formula (1-2), $Q^{11}$ and $Q^{12}$ each represent a divalent linking group or a single bond. The divalent linking group is preferably —CH=CH—, —CH=N—, —N=N—, —N(O)=N—, —COO—, —COS—, —CONH—, —COCH$_2$—, —CH$_2$CH$_2$—, —OCH$_2$—, —CH$_2$NH—, —CH$_2$—, —CO—, —O—, —S—, —NH—, —(CH$_2$)$_{(1\ to\ 3)}$—, —CH=CH—COO—, —CH=CH—CO—, —(C≡C)$_{(1\ to\ 3)}$—, or their combination, more preferably —CH$_2$—, —CO—, —O—, —CH=CH—, —CH=N—, —N=N—, or their combination. The hydrogen atom of these divalent linking groups may be substituted with any other substituent. Preferably, Q$^{11}$ and Q$^{12}$ each are —CO—, —O—, a single bond, or their combination.

Y$^{11}$ represents a divalent, 4-, 5-, 6- or 7-membered ring substituent, or a condensed ring substituent composed of such rings; and m12 indicates an integer of from 1 to 3. Preferably, Y$^{11}$ is a 6-membered aromatic group, a 4- to 6-membered saturated or unsaturated aliphatic group, a 5- or 6-membered heterocyclic group, or their condensed ring. Preferred examples of Y$^{11}$ are the following substituents (Y-1) to (Y-28) and their combinations. Of these substituents, more preferred are (Y-1), (Y-2), (Y-18), (Y-19), (Y-21) and (Y-22); and even more preferred are (Y-1), (Y-2) and (Y-21).

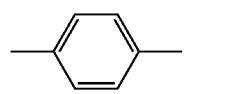
(Y-1)

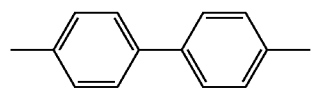
(Y-2)

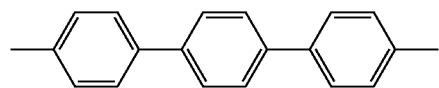
(Y-3)

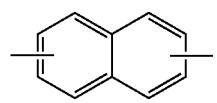
(Y-4)

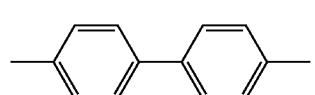
(Y-5)

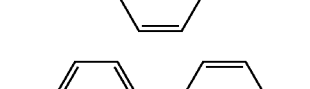
(Y-6)
X = CH$_2$, O, CO, NH

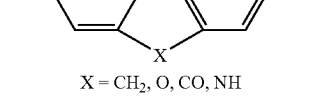
(Y-7)

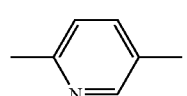
(Y-8)

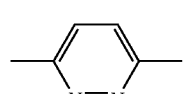
(Y-9)

-continued

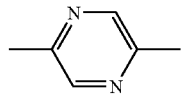
(Y-10)

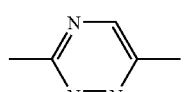
(Y-11)

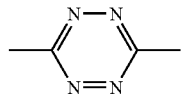
(Y-12)

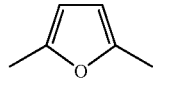
(Y-13)

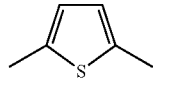
(Y-14)

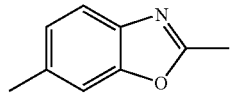
(Y-15)

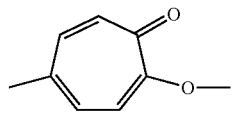
(Y-16)

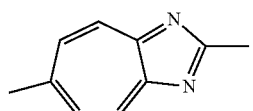
(Y-17)

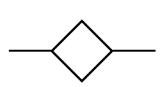
(Y-18)

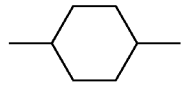
(Y-19)

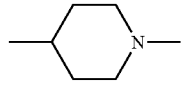
(Y-20)

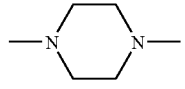
(Y-21)

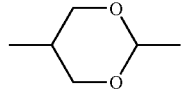
(Y-22)

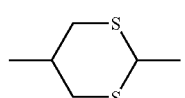
(Y-23)

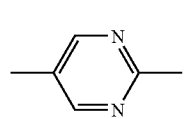
(Y-24)

-continued

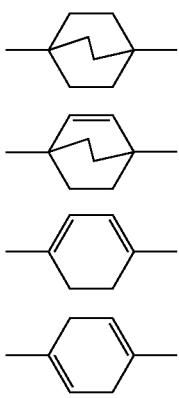
(Y-25)
(Y-26)
(Y-27)
(Y-28)

Preferably, the organosilicon compound contains an alkyl or alkylene group having at least 5 carbon atoms, along with the mesogen group therein for further enhancing the molecular orientation thereof. Preferably, the alkyl or alkylene group has from 5 to 25 carbon atoms, more preferably from 6 to 18 carbon atoms. The alkyl or alkylene group may be substituted. Preferred examples of the substituent for the group are mentioned below.

(1) Alkyl Group:
The alkyl group may be optionally substituted, and is more preferably an alkyl group having from 1 to 24 carbon atoms, even more preferably from 1 to 10 carbon atoms. It may be linear or branched. For example, it includes methyl, ethyl, propyl, butyl, i-propyl, i-butyl, pentyl, hexyl, octyl, 2-ethylhexyl, t-octyl, decyl, dodecyl, tetradecyl, 2-hexyldecyl, hexadecyl, octadecyl, cyclohexylmethyl and octylcyclohexyl groups.

(2) Aryl Group:
The aryl group may be optionally substituted and condensed, and is more preferably an aryl group having from 6 to 24 carbon atoms. For example, it includes phenyl, 4-methylphenyl, 3-cyanophenyl, 2-chlorophenyl and 2-naphthyl groups.

(3) Heterocyclic Group:
The heterocyclic group may be optionally substituted and condensed. When it is a nitrogen-containing heterocyclic group, the nitrogen atom in the ring thereof may be optionally quaternated. More preferably, the heterocyclic group has from 2 to 24 carbon atoms. For example, it includes 4-pyridyl, 2-pyridyl, 1-octylpyridinium-4-yl, 2-pyrimidyl, 2-imidazolyl and 2-thiazolyl groups.

(4) Alkoxy Group:
More preferably, the alkoxy group has from 1 to 24 carbon atoms. For example, it includes methoxy, ethoxy, butoxy, octyloxy, methoxyethoxy, methoxypenta(ethyloxy), acryloyloxyethoxy and pentafluoropropoxy groups.

(5) Acyloxy Group:
More preferably, the acyloxy group has from 1 to 24 carbon atoms. For example, it includes acetyloxy and benzoyloxy groups.

(6) Alkoxycarbonyl Group:
More preferably, the alkoxycarbonyl group has from 2 to 24 carbon atoms. For example, it includes methoxycarbonyl and ethoxycarbonyl groups.

(7) Cyano Group:

(8) Fluoro Group:

(9) Alkoxycarbonyl Group:

(10) Polymerizing Group:
Its preferred examples are vinyl, acryloyl, methacryloyl, styryl and cinnamoyl groups.

Especially preferably, the alkyl or alkylene group is unsubstituted or has a polymerizing group at its end.

The silyl group ($-Si(X^1)_{3-m11}(R^{11})_{m11}$) directly bonds to the mesogen group, the alkyl group or the alkenyl group that constitutes the organic atomic group $A^1$, or bonds thereto via a linking group. The linking group is preferably an alkylene group having from 1 to 15 carbon atoms, or a combination of the linking groups $Q^{11}$ and $Q^{12}$ of the mesogen group. Preferably, the silyl group bonds to the alkylene group.

Preferably in formula (1-1), $X^1$ is an alkoxy group (OR in which $R^{14}$ is an alkyl group); m11 is 0; and n is an integer of from 1 to 4. Specific examples (S-1-1) to (S-1-29) of the organosilicon compounds are mentioned below, to which, however, the invention is not limited. With no limitation thereon, the compounds may be any of liquid, liquid-crystalline or crystalline ones at room temperature.

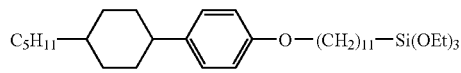
(S-1-1)

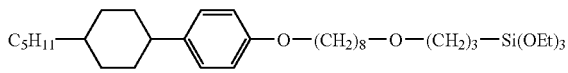
(S-1-2)

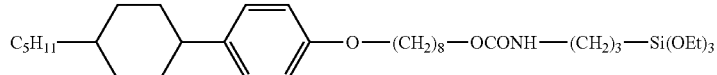
(S-1-3)

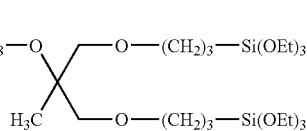
(S-1-4)

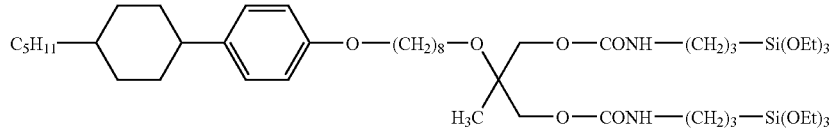
(S-1-5)

-continued
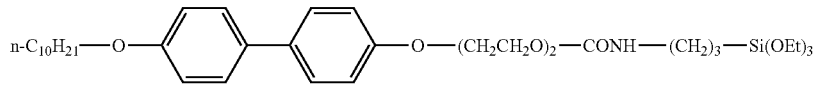
(S-1-6)
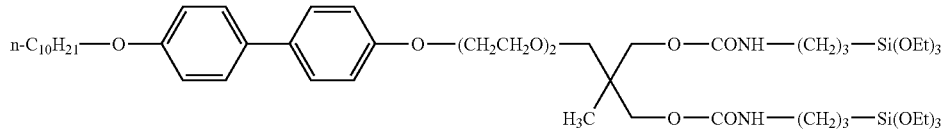
(S-1-7)
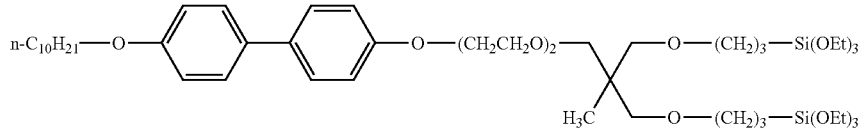
(S-1-8)
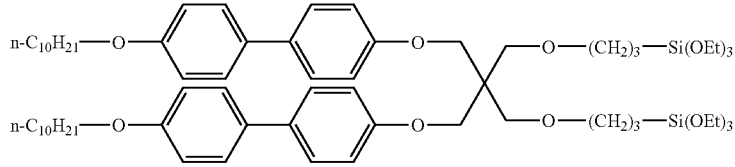
(S-1-9)
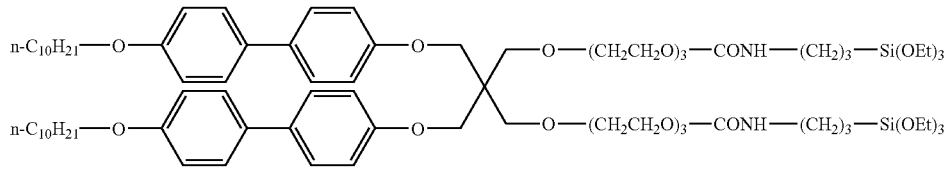
(S-1-10)
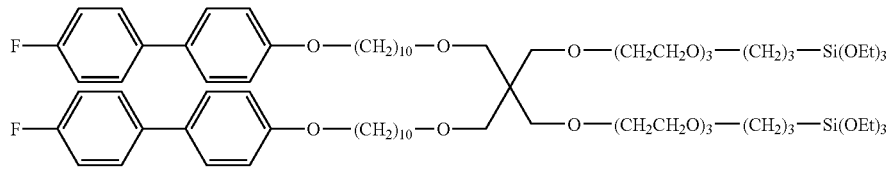
(S-1-11)
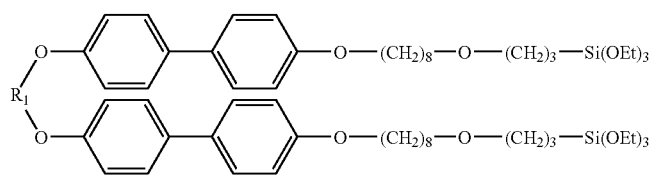
(S-1-12)
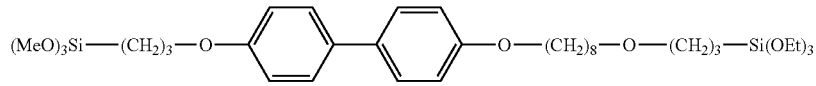
(S-1-13)
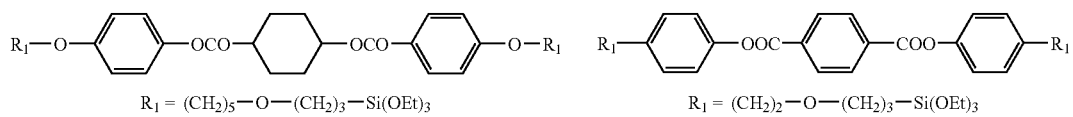
(S-1-14) (S-1-15)
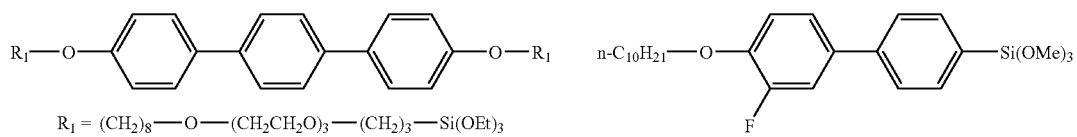
(S-1-16) (S-1-17)

-continued
(S-1-18)
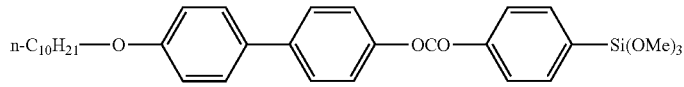
(S-1-19)
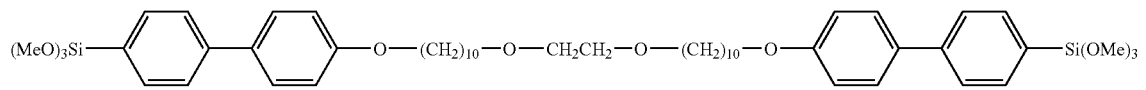
(S-1-20)
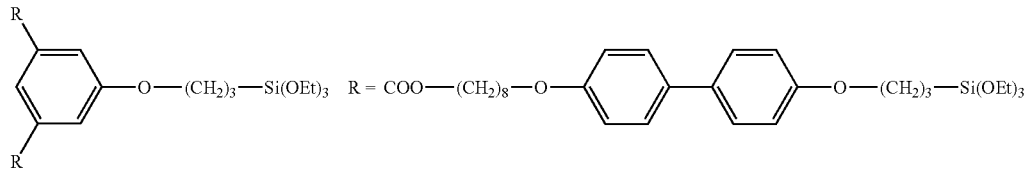
(S-1-21)
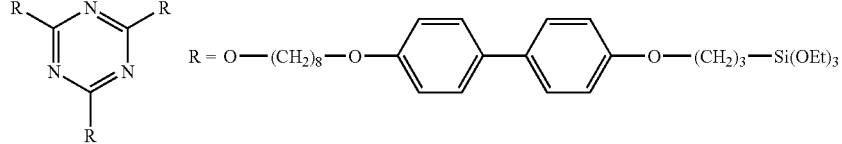
(S-1-22)
(S-1-23)
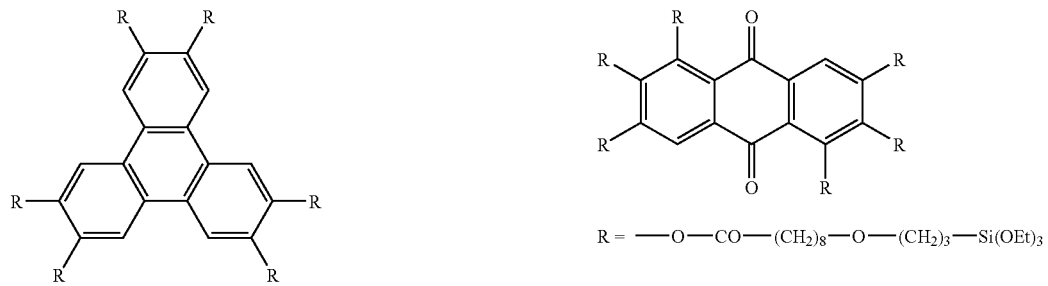
(S-1-24)
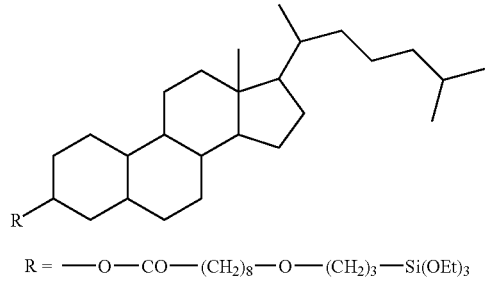
(S-1-25)
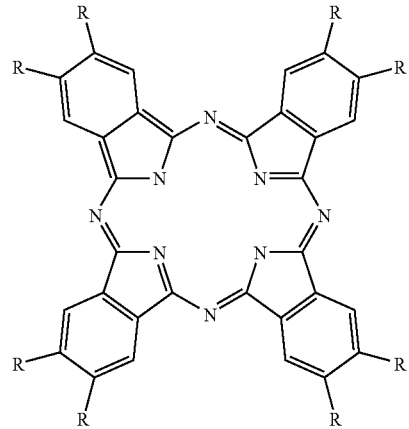
(S-1-26)
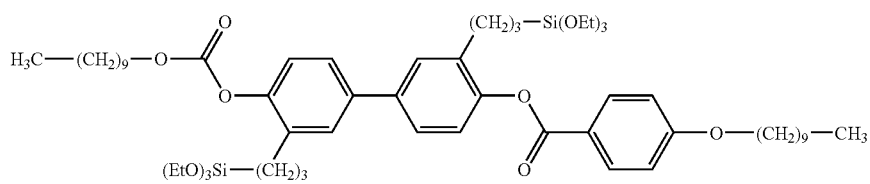

-continued

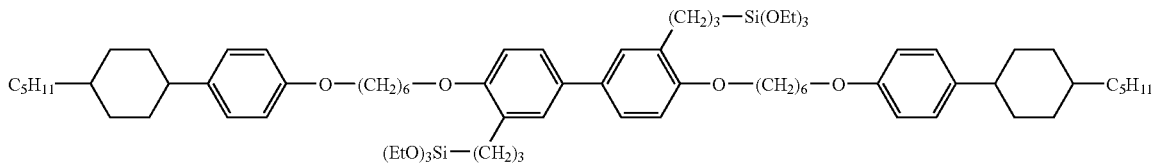
(S-1-27)

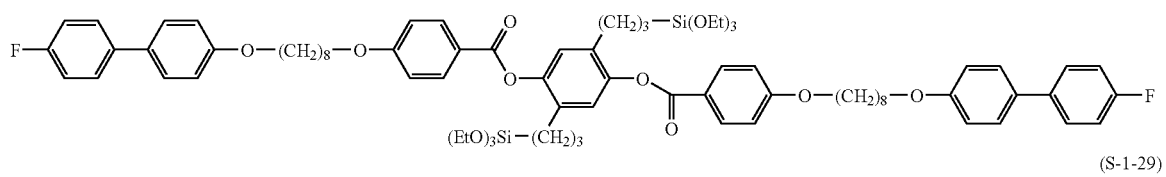
(S-1-28)

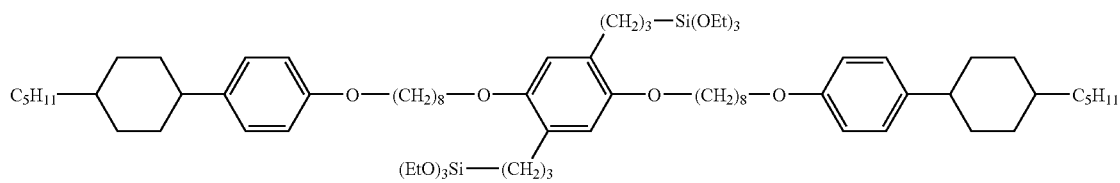
(S-1-29)

Next described is the second organic-inorganic hybrid material of the invention. This is produced by three-dimensionally crosslinking a precursor, organosilicon compound that has an alkoxysilyl group, a mesogen group and a substituent capable of forming a carbon-carbon bond or a carbon-oxygen bond through polymerization. Preferably, the precursor is a compound of the following formula (2-1):

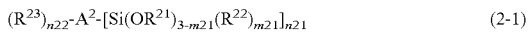
(2-1)

In formula (2-1), $R^{21}$ represents an alkyl group, and $R^{22}$ represents an alkyl group, an aryl group or a heterocyclic group. Preferred examples of the alkyl group for $R^{21}$ and $R^{22}$ are a linear, branched or cyclic alkyl group (having from 1 to 20 carbon atoms, such as methyl, ethyl, isopropyl, n-butyl, 2-ethylhexyl, n-decyl, cyclopropyl, cyclohexyl, cyclododecyl). Preferred examples of the aryl group are a substituted or unsubstituted phenyl group having from 6 to 20 carbon atoms, and a substituted or unsubstituted naphthyl group having from 10 to 20 carbon atoms. Preferred examples of the heterocyclic group are substituted or unsubstituted 6-membered hetero rings (e.g., pyridyl, morpholino), and substituted or unsubstituted 5-membered hetero rings (e.g., furyl, thiophene). $A^2$ has the same meaning as $A^1$ in formula (1-1).

$R^{23}$ represents a substituent group capable of newly forming a carbon-carbon bond or a carbon-oxygen bond to give a polymer. Preferably, it is selected from an acryloyl group, a methacryloyl group, a vinyl group, an ethynyl group, and an alkyleneoxide group (e.g., ethyleneoxide, trimethyleneoxide). Especially preferred are acryloyl, methacryloyl, ethyleneoxide and trimethyleneoxide groups. The presence of $R^{23}$ in the compound produces good results in that the mechanical strength of the proton-conductive membrane formed of the material is enhanced and the membrane formation is easy since the compound is polymerized after sol-gel reaction.

The silyl group ($-Si(OR^{21})_{3-m21}(R^{22})_{m21}$) has the same meaning as the silyl group in formula (1-1). Like the organosilicon compound for the first hybrid material of the invention, the organosilicon compound of this case preferably contains an alkyl or alkylene group having at least 5 carbon atoms, along with the mesogen group therein for further enhancing the molecular orientation thereof.

Specific examples (S-2-1) to (S-2-31) of the organosilicon compound for the second hybrid material of the invention are mentioned below, to which, however, the invention is not limited.

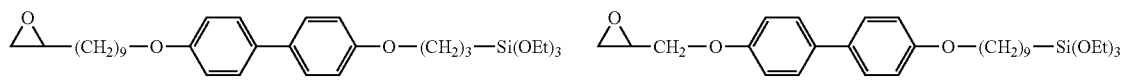
(S-2-1) (S-2-2)

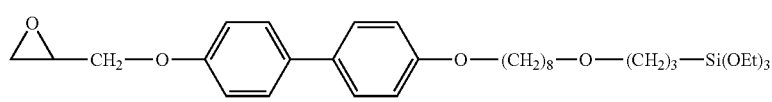
(S-2-3)

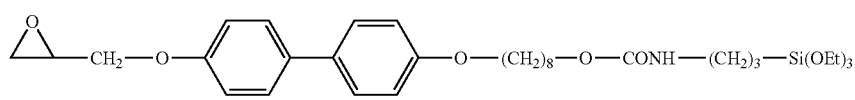
(S-2-4)

-continued
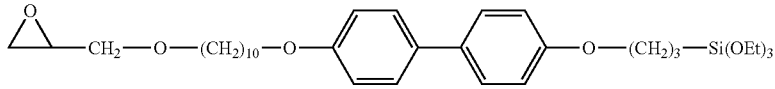
(S-2-5)
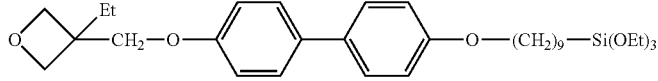
(S-2-6)
(S-2-7)
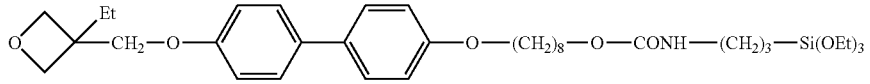
(S-2-8)
(S-2-9)
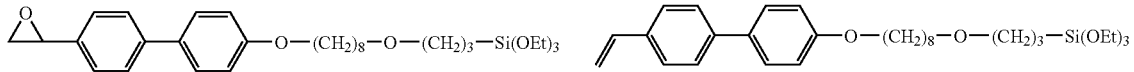
(S-2-10) (S-2-11)
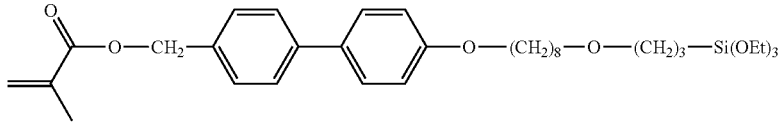
(S-2-12)
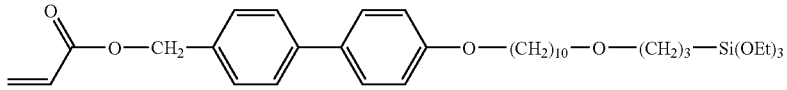
(S-2-13)
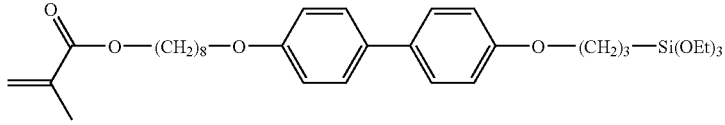
(S-2-14)
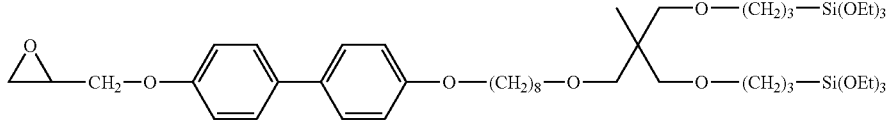
(S-2-15)
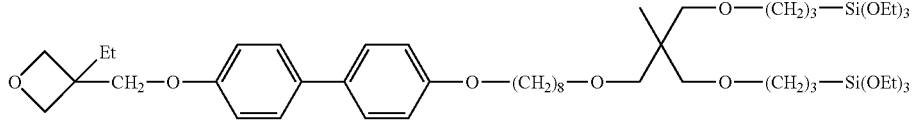
(S-2-16)
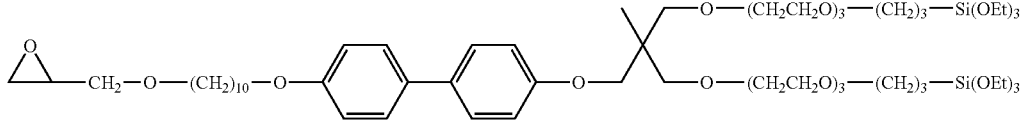
(S-2-17)
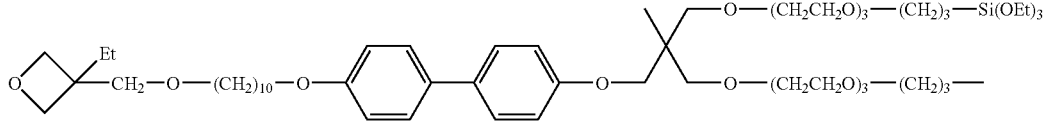
(S-2-18)

-continued
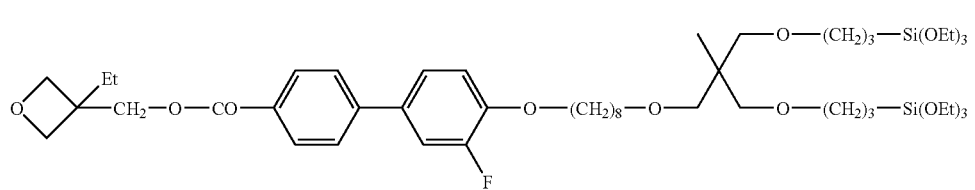
(S-2-19)
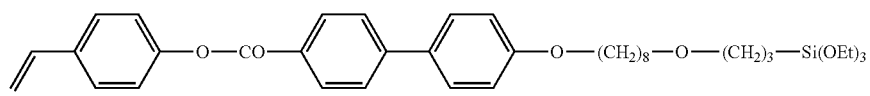
(S-2-20)
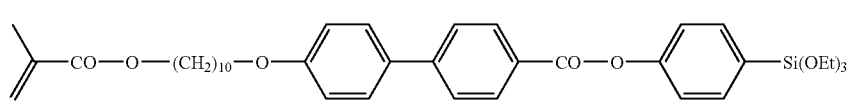
(S-2-21)
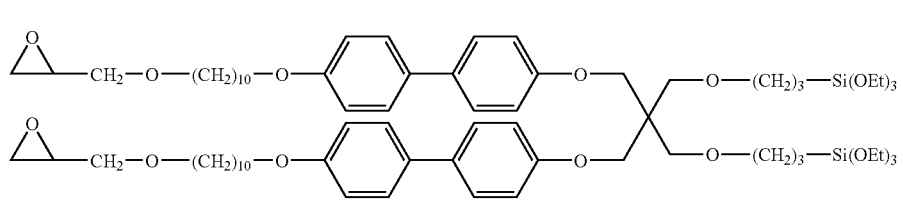
(S-2-22)
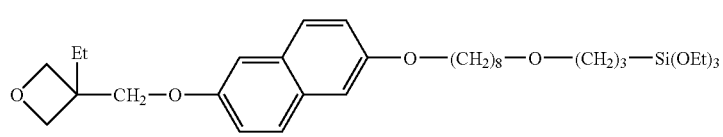
(S-2-23)
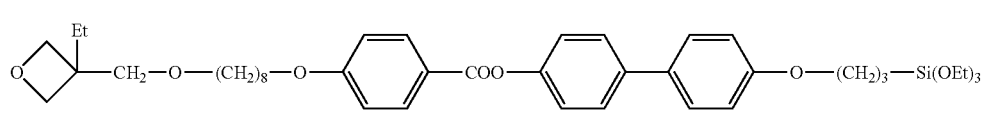
(S-2-24)
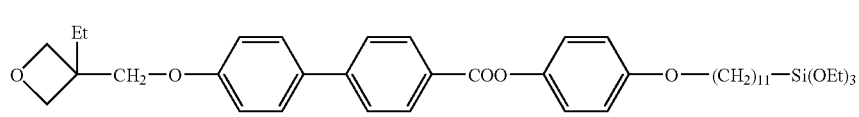
(S-2-25)
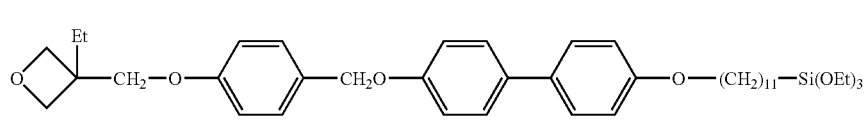
(S-2-26)
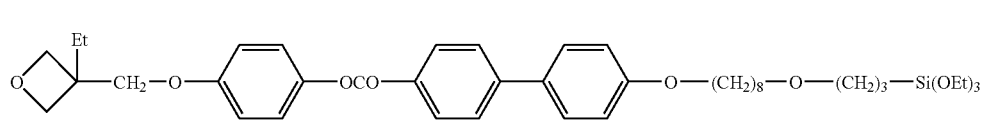
(S-2-27)
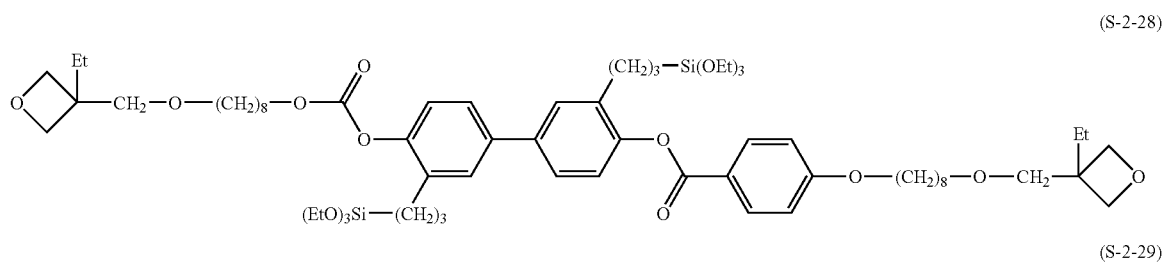
(S-2-28)
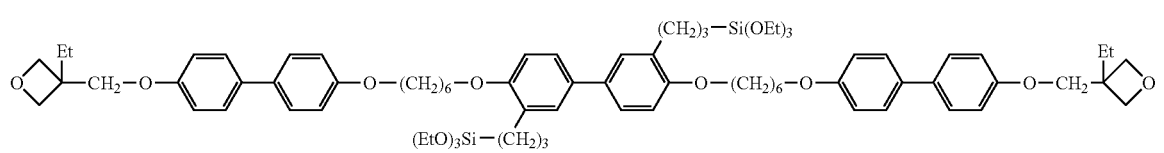
(S-2-29)

-continued

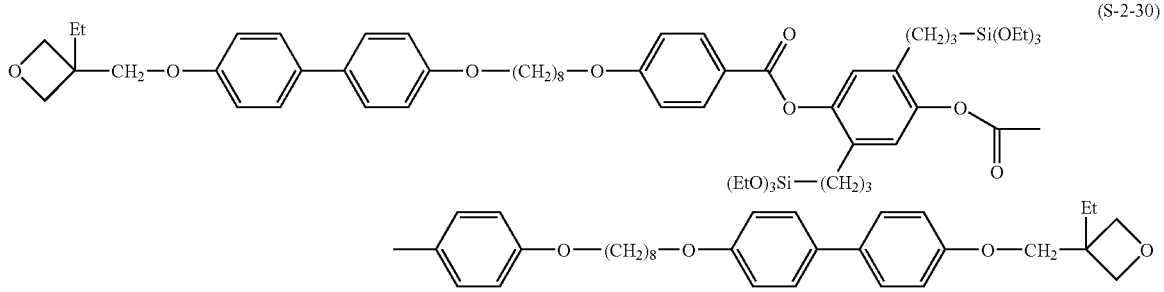
(S-2-30)

The third organic-inorganic hybrid material of the invention is produced by crosslinking and polymerizing a precursor, polymer compound having, in its side branches, an atomic group that contains an alkoxysilyl group, a mesogen group and an alkylene group. Preferably, the precursor is a polymer compound having a repeating unit of the following formula (3-1):

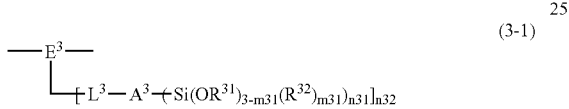
(3-1)

In formula (3-1), $R^{31}$ represents an alkyl group, and $R^{32}$ represents an alkyl group, an aryl group or a heterocyclic group. Preferred examples of the alkyl group for $R^{31}$ and $R^{32}$ are a linear, branched or cyclic alkyl group (having from 1 to 20 carbon atoms, such as methyl, ethyl, isopropyl, n-butyl, 2-ethylhexyl, n-decyl, cyclopropyl, cyclohexyl, cyclododecyl). Preferred examples of the aryl group are a substituted or unsubstituted phenyl group having from 6 to 20 carbon atoms, and a substituted or unsubstituted naphthyl group having from 10 to 20 carbon atoms. Preferred examples of the heterocyclic group are substituted or unsubstituted 6-membered hetero rings (e.g., pyridyl, morpholino), and substituted or unsubstituted 5-membered hetero rings (e.g., furyl, thiophene). $A^3$ has the same meaning as $A^1$ in formula (1-1).

$E^3$ represents an alkylene group, an alkyleneoxy group or a siloxy group. When $E^3$ is an alkylene group, it is preferably an ethylene group of the following formula (3-a); when it is an alkyleneoxy group, it is preferably an ethyleneoxy group of the following formula (3-b) or a trimethyleneoxy group of the following formula (3-c); and when it is a siloxy group, it is preferably represented by the following formula (3-d). These groups of formulae (3-a) to (3-c) may be further substituted.

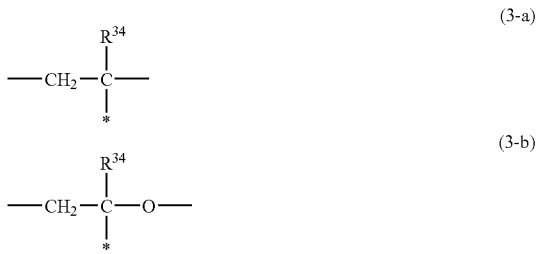

(3-a)

(3-b)

(3-c)

(3-d)

In formulae (3-a) to (3-d), $R^{34}$ represents an alkyl group (preferably having from 1 to 12 carbon atoms, such as methyl, ethyl, propyl, hexyl, dodecyl), or a hydrogen atom; *indicates the position at which the group bonds to the linking group $L^3$; $R^{35}$ represents $R^{34}$ or a single bond (—*).

$L^3$ represents a linking group. Preferably, it is a divalent linking group such as —COO—, —OCO—, —(CH$_2$)$_{nn3}$—, —(CH$_2$)$_{nn3}$O—, —O(CH$_2$)$_{nn3}$—, —CON(R$^{34}$)—, phenylene. ** indicates the position at which the group bonds to $E^3$; $R^{34}$ has the same meaning as $R^{34}$; and nn3 indicates an integer of from 1 to 6. $L^3$ may be the same linking group as $Q^{11}$ and $Q^{12}$.

Preferably, $E^3$ and $L^3$ are a combination of any of the following formulae (3-e) to (3-h):

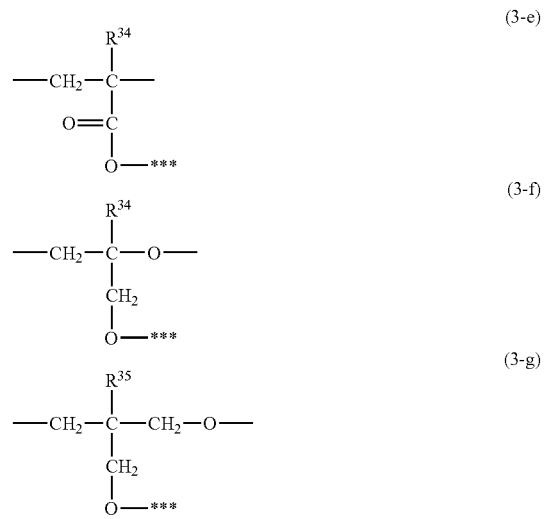

(3-e)

(3-f)

(3-g)

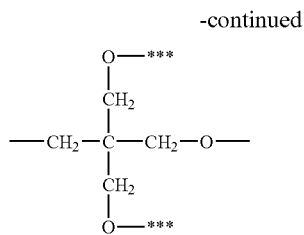
(3-h)

In formulae (3-e) to (3-h), ***indicates the position at which the group bonds to $A^3$. More preferred combinations are formula (3-f) where $R^{34}$=H; formula (3-g) where $R^{35}$=H, $CH_3$ or $CH_2CH_3$; and formula (3-h).

The silyl group ($—Si(OR^{31})_{3-m31}(R^{32})_{m31}$) has the same meaning as the silyl group in formula (1-1).

In formula (3-1), m31 indicates an integer of from 0 to 2 and is preferably 0; n31 indicates an integer of from 1 to 10 and is preferably an integer of from 1 to 3; n32 indicates an integer of from 1 to 5 and is preferably 1 or 2. The molecular weight of the organosilicon polymer compound for the third hybrid material of the invention may vary depending on the polymerization condition for the compound, and is therefore any desired one. Preferably, however, the number-average molecular weight of the compound is from 5,000 to 500,000, more preferably from 5,000 to 50,000. Like the organosilicon compound for the first hybrid material of the invention, the organosilicon compound of this case preferably contains an alkyl or alkylene group having at least 5 carbon atoms, along with the mesogen group therein for further enhancing the molecular orientation thereof.

Specific examples (S-3-1) to (S-3-20) of the precursor, organosilicon polymer compound are mentioned below, to which, however, the invention is not limited.

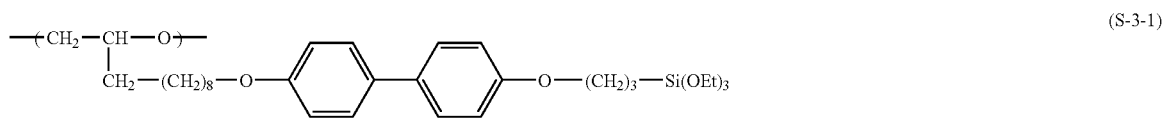
(S-3-1)

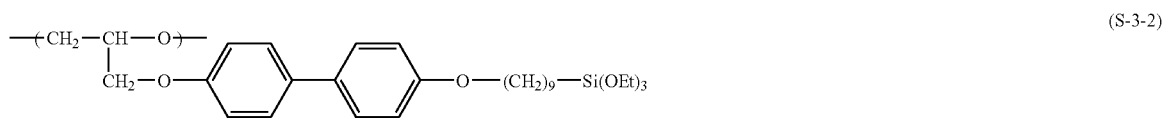
(S-3-2)

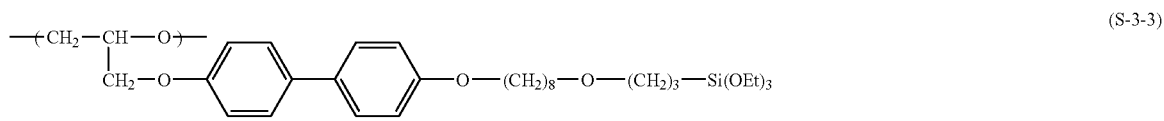
(S-3-3)

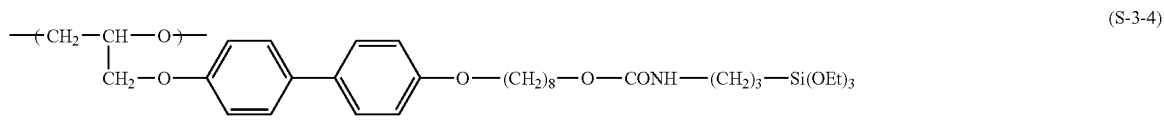
(S-3-4)

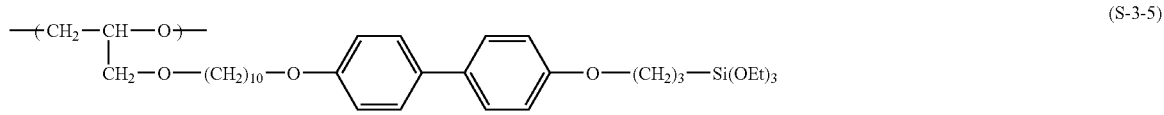
(S-3-5)

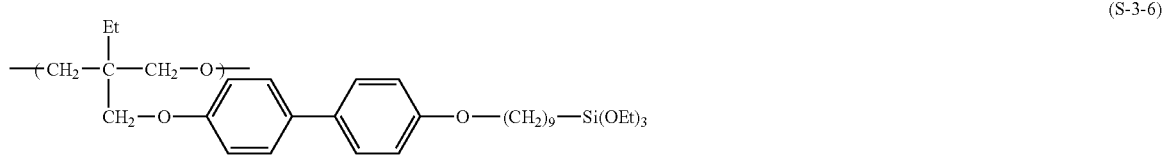
(S-3-6)

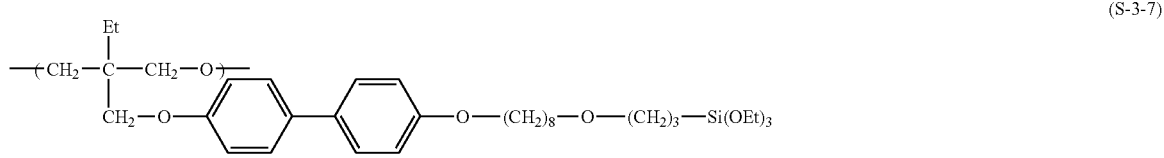
(S-3-7)

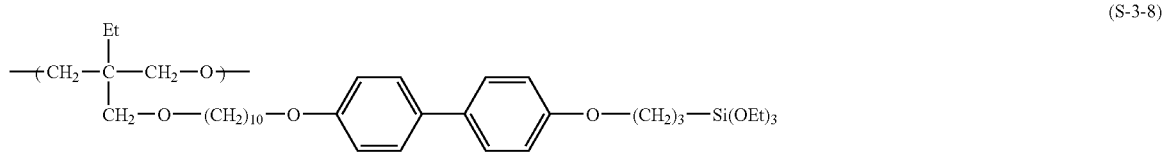
(S-3-8)

-continued
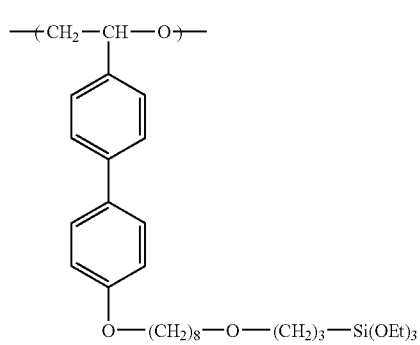 (S-3-9)
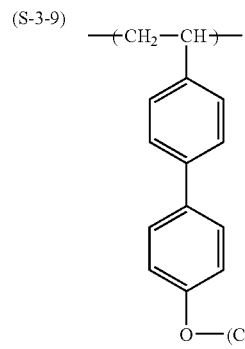 (S-3-10)
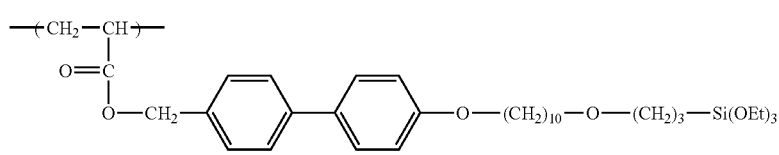 (S-3-11)
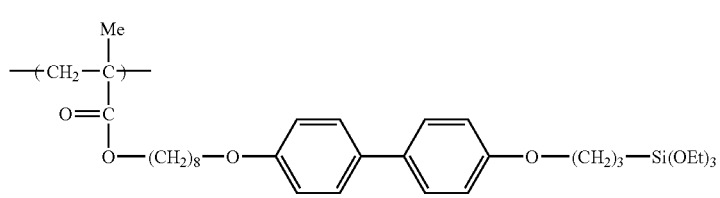 (S-3-12)
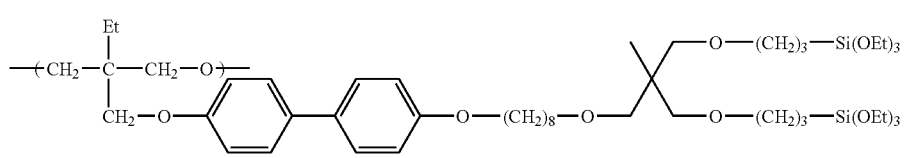 (S-3-13)
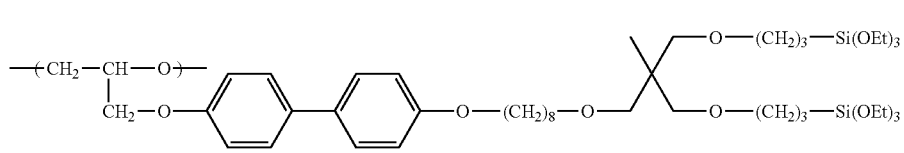 (S-3-14)
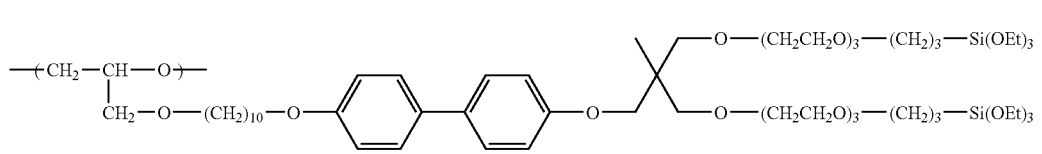 (S-3-15)
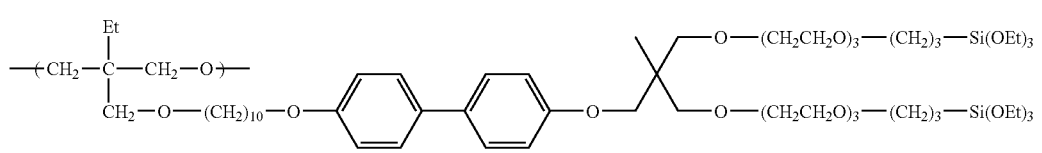 (S-3-16)
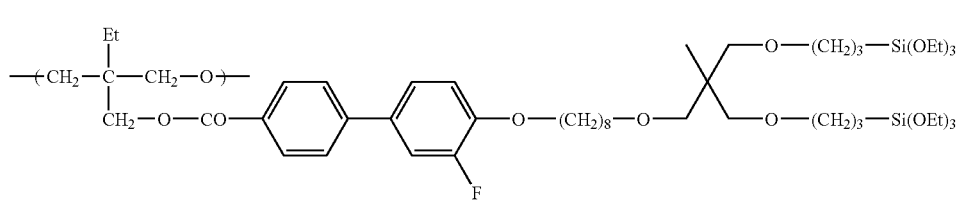 (S-3-17)

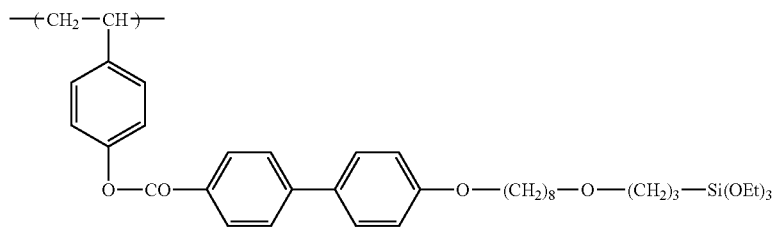
(S-3-18)

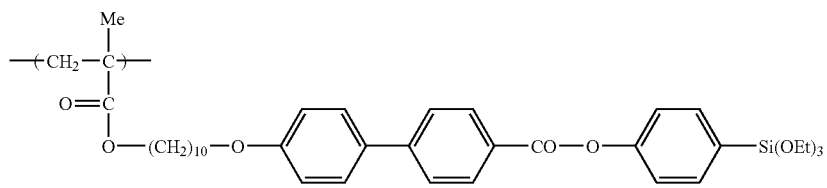
(S-3-19)

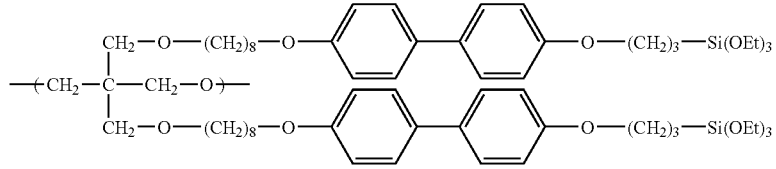
(S-3-20)

[2] Organic-Inorganic Hybrid Material:

[2-1] Method of Forming Organic-Inorganic Hybrid Material:

In the invention, generally employed is a sol-gel process that uses an organosilicone compound as the precursor and comprises metal alkoxide hydrolysis, dehydrating condensation, polymerization and drying (optionally firing) to give a solid (for example, *Electrochimica Acta*). Optionally, the solid thus obtained is polymerized at the polymerizing group (e.g., $R^{23}$) introduced into the organosilicon compound precursor, to thereby newly form a carbon-carbon bond or a carbon-oxygen bond to give a polymer. In this case, acid or alkali that serves as a catalyst for controlling the hydrolysis or polymerization may be used. For the alkali, generally used is an alkali metal hydroxide such as NaOH, KOH, or ammonia. Concretely, methods mentioned below may be employed herein.

Some examples of sol-gel process are described in, for example, JP-A 2000-272932, 2000-256007, 2000-357524, 2001-93543; *Electrochimica Acta*, 1998, Vol. 43, Nos. 10-11, p. 1301; and Japanese Patent 3,103,888, and these may apply to the invention. One typical example of the process is described. The organosilicon compound for the first hybrid material of the invention is dissolved in a solvent, to which are added water and acid to thereby attain alkoxysilyl hydrolysis and polycondensation (sol-gel reaction). In this stage, the viscosity of the reaction mixture (sol) gradually increases, and the solvent is evaporated away. After dried, a solid (gel) is obtained. While fluid, the sol may be cast into a desired vessel or applied onto a substrate, and thereafter the solvent is evaporated away and the remaining sol is dried to give a solid having a desired shape, such as a tabular or filmy solid. Thus obtained, the solid may be ground and compression-molded into tabular moldings. For further densifying the silica network formed therein, the solid may be optionally heated after dried.

The solvent for the sol-gel reaction is not specifically defined so far as it dissolves the organosilicon compound as a precursor. For it, however, preferred are carbonate compounds (e.g., ethylene carbonate, propylene carbonate), heterocyclic compounds (e.g., 3-methyl-2-oxazolidinone, N-methylpyrrolidone), cyclic ethers (e.g., dioxane, tetrahydrofuran), linear ethers (e.g., diethyl ether, ethylene glycol dialkyl ether, propylene glycol dialkyl ether, polyethylene glycol dialkyl ether, polypropylene glycol dialkyl ether), alcohols (e.g., methanol, ethanol, isopropanol, ethylene glycol monoalkyl ether, propylene glycol monoalkyl ether, polyethylene glycol monoalkyl ether, polypropylene glycol monoalkyl ether), polyalcohols (e.g., ethylene glycol, propylene glycol, polyethylene glycol, polypropylene glycol, glycerin), nitrile compounds (e.g., acetonitrile, glutarodinitrile, methoxyacetonitrile, propionitrile, benzonitrile), esters (e.g., carboxylates, phosphates, phosphonates), aprotic polar substances (e.g., dimethylsulfoxide, sulforane, dimethylformamide, dimethylacetamide), non-polar solvents (e.g., toluene, xylene), chlorine-containing solvents (e.g., methylene chloride, ethylene chloride), water, etc. Above all, especially preferred are alcohols such as ethanol, isopropanol, nitrile compounds such as acetonitrile, glutarodinitrile, methoxyacetonitrile, propionitrile, benzonitrile; and cyclic ethers such as dioxane, tetrahydrofuran. One or more of these may be used herein either singly or as combined.

For controlling the drying speed, a solvent having a boiling point of not lower than 100° C., such as N-methylpyrrolidone, dimethylacetamide, sulforane or dioxane may be added to the above-mentioned solvent. The total amount of the solvent is preferably from 0.1 to 100 g, more preferably from 1 to 10 g, relative to 1 g of the precursor compound.

For the acid catalyst for the sol-gel reaction, preferred is an inorganic or organic proton acid. The inorganic proton acid includes, for example, hydrochloric acid, sulfuric acid, phosphoric acids (e.g., $H_3PO_4$, $H_3PO_3$, $H_4P_2O_7$, $H_5P_3O_{10}$, metaphosphoric acid, hexafluorophosphoric acid), boric acid, nitric acid, perchloric acid, tetrafluoroboric acid, hexafluoroarsenic acid, hydrobromic acid, solid acids (e.g., tungstophosphoric acid, tungsten-peroxo complex). For the organic proton acid, for example, usable are low-molecular compounds such as phosphates (for example, those with from 1 to 30 carbon atoms, such as methyl phosphate, propyl phosphate, dodecyl phosphate, phenyl phosphate, dimethyl phosphate, didodecyl phosphate), phosphites (for example, those with from 1 to 30 carbon atoms, such as methyl phosphite, dodecyl phosphite, diethyl phosphite, diisopropyl phosphite, didodecyl phosphite), sulfonic acids (for example, those with from 1 to 15 carbon atoms, such as benzenesulfonic acid, toluenesulfonic acid, hexafluorobenzenesulfonic acid, trifluoromethanesulfonic acid, dodecylsulfonic acid), carboxylic acids (for example, those with from 1 to 15 carbon atoms, such as acetic acid, trifluoroacetic acid, benzoic acid, substituted benzoic acids), imides (e.g., bis(trifluoromethanesulfonyl)imido acid, trifluoromethanesulfonyltrifluoroacetamide), phosphonic acids (for example, those with from 1 to 30 carbon atoms, such as methylphosphonic acid, ethylphosphonic acid, phenylphosphonic acid, diphenylphosphonic acid, 1,5-naphthalenebisphosphonic acid); and proton acid segment-having polymer compounds, for example, perfluorocarbonsulfonic acid polymers such as typically Nafion®, poly(meth)acrylates having a phosphoric acid group in side branches (JP-A 2001-114834), and sulfonated, heat-resistant aromatic polymers such as sulfonated polyether-ether ketones (JP-A 6-93111), sulfonated polyether sulfones (JP-A 10-45913), sulfonated polysulfones (JP-A 9-245818). Two or more of these may be used herein, as combined. For the solid acid, especially preferred are $\alpha$—Zr $(HPO_4)_2 \cdot nH_2O$, $\gamma$—$Zr(PO_4)$ $(H_2PO_4) \cdot 2H_2O$; phyllo-structured compounds such as $\alpha$—Zr sulfophenylphosphate, $\gamma$—Zr sulfophenylphosphate; hydrate oxides such as $SnO_2 \cdot 2H_2O$, $Sb_2O_5 \cdot 5 \cdot 4H_2O$; and heteropolyphosphoric acids such as $H_4SiW_{12}O_{40} \cdot nH_2O$, $H_3PW_{12}O_{40} \cdot nH_2O$.

The proton acid acts as a catalyst for sol-gel reaction and, after having acted for the reaction, it still remains in the solid formed through the reaction. For the organic-inorganic hybrid material, the proton acid remaining in the solid may be washed away, and the solid may be used for liquid-crystal materials. However, for the organic-inorganic hybrid proton-conductive material, the proton acid may function as a proton conductivity donor. Therefore, it is desirable that the proton acid is kept in the solid as much as possible. As the case may be, any additional proton source except the proton acid used as the catalyst for the sol-gel reaction may be further added to the solid. For the additional proton source, preferred are phosphorus compounds capable of forming a chemical bond (Si—O—P) in the silicate network (preferably, phosphoric acids, phosphates); organic sulfonic acids having a low solubility in water; polymer compounds having a hardly-releasable proton acid segment; and solid acids capable of physically interacting with silica so as to be held by it. Above all, especially preferred are phosphorus compounds such as $H_3PO_4$, $H_3PO_3$, phosphates, phosphites; and organic sulfinic acids and perfluorocarbonsulfonic acid polymers. Preferably, the amount of the acid to be added is from 0.1 to 10 molar equivalents, more preferably from 0.5 to 5 molar equivalents relative to Si in the precursor, silicon compound.

The reaction temperature in the sol-gel reaction is associated with the reaction speed, and it may be suitably determined depending on the reactivity of the precursor and on the type and the amount of the acid. Preferably, it falls between −20 and 150° C., more preferably between 0 and 80° C., even more preferably between 20 and 60° C.

[2-2] Addition of Plasticizing Compound:

To the proton-conductive membrane of the invention, a compound of the following formula (1-4) and/or (1-5) which does not change through sol-gel reaction and which serves as a plasticizer may be added so as to make the membrane more flexible. The amount of the compound to be added may be from 1 mol % to 50 mol %, preferably from 5 mol % to 20 mol % relative to the organosilicon compound to form the membrane.

(1-4)

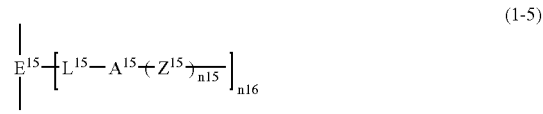

(1-5)

In formulae (1-4) and (1-5), $A^{14}$ and $A^{15}$ each represent an organic atomic group that contains a mesogen and an alkylene group having at least 4 carbon atoms. The mesogen has the same meaning as $A^1$ in the above-mentioned, mesogen-containing organosilicon compound. Especially preferably, it is the same as the mesogen in the mesogen-containing organosilicon compound that is used in forming the proton-conductive membrane of the invention.

$Z^{14}$ and $Z^{15}$ each represent a substituent not changing in sol-gel reaction, or a hydrogen atom. Preferred examples of the substituent are 1. alkyl group, 2. aryl group, 3. heterocyclic group, 4. alkoxy group, 5. acyloxy group, 6. alkoxycarbonyl group, 7. cyano group, 8. fluoro group and 9. alkoxycarbonyl group described hereinabove for the substituent that may be in formula (1-1), and in addition to these, hydroxyl group; acid residues such as carboxyl group, sulfo group, sulfino group and phosphono group; and vinyl group are also preferred for the substituent. Of those, especially preferred are hydrogen atom, hydroxyl group, acid residues and vinyl group.

n13 and n15 each indicate an integer of from 1 to 8, and are especially preferably 1 or 2. n14 indicates an integer of from 0 to 4, and is especially preferably 1 or 2. n16 indicate an integer of from 1 to 5, and is especially preferably 1 or 2. When n13 or n15 is 2 or more, then $Z^{14}$'s or $Z^{15}$'s may be the same or different. When n16 is 2 or more, then the constitutive units may be the same or different.

$Y^{14}$ represents a polymerizing group that may form a carbon-carbon bond or a carbon-oxygen bond through polymerization, and this has the same meaning as $Y^{11}$ in the organosilicon compound of formula (1-1). Especially preferably, $Y^{14}$ is the same as $Y^{11}$ in the mesogen-containing organosilicon compound that forms the proton-conductive membrane of the invention. When $n^{15}$ is 2 or more, then $Z^{15}$'s may be the same or different.

$E^{15}$ and $L^{15}$ have the same meanings and the same preferable structures as $E^3$ and $L^3$, respectively, in formula (3-1). Depending on the polymerization condition, the compounds having a structure of formulae (3-e) to (3-h) may have any desired molecular weight. Preferably, they have a number-average molecular weight of from 5,000 to 500,000, more preferably from 5,000 to 50,000.

Specific examples of the compounds of formulae (1-4) and (1-5) are mentioned below, to which, however, the invention is not limited.

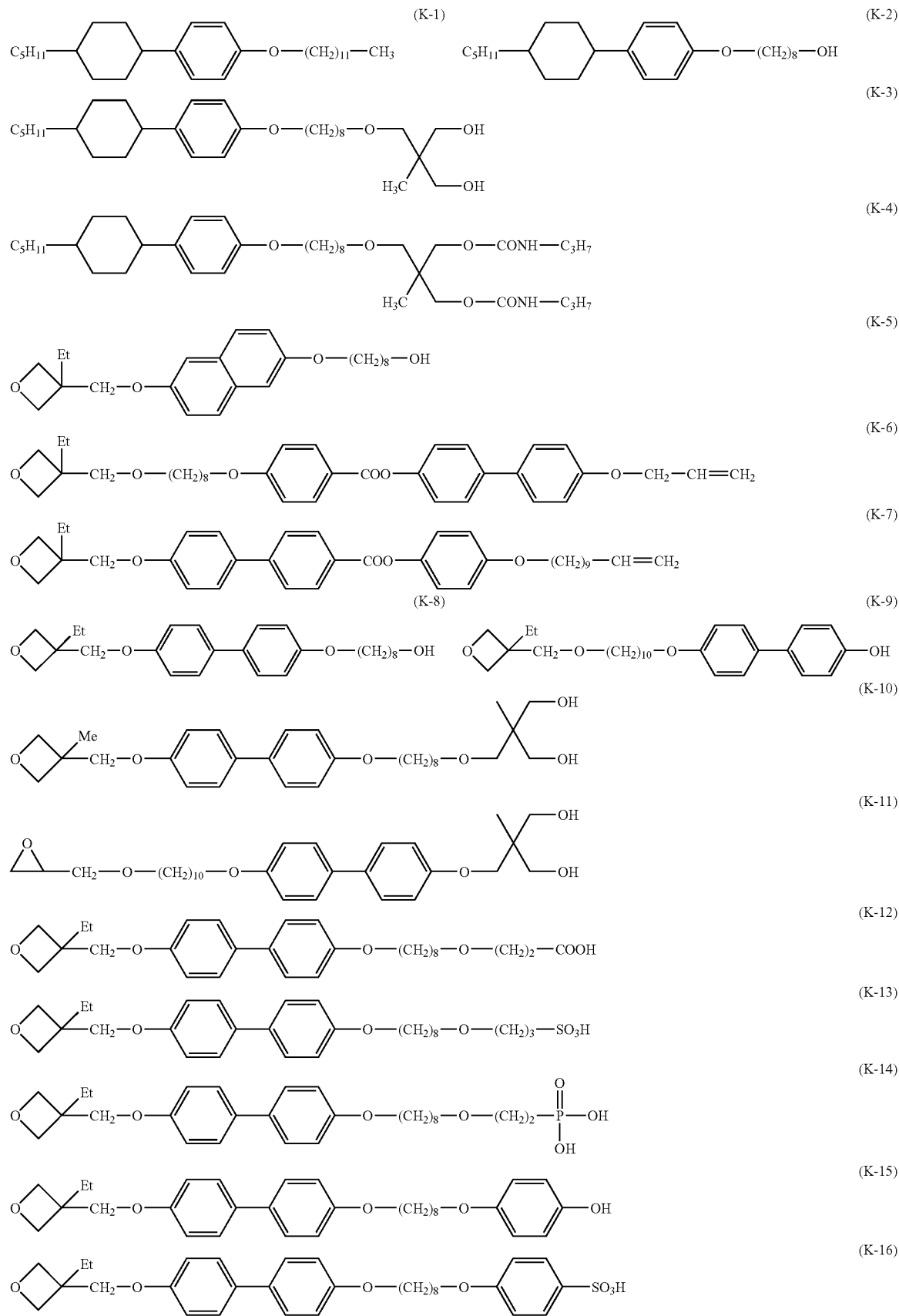

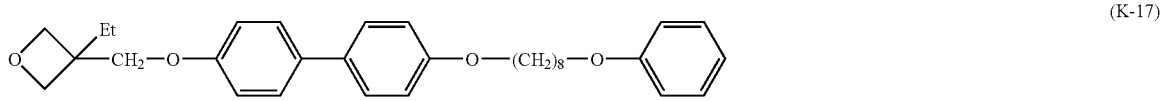
(K-17)

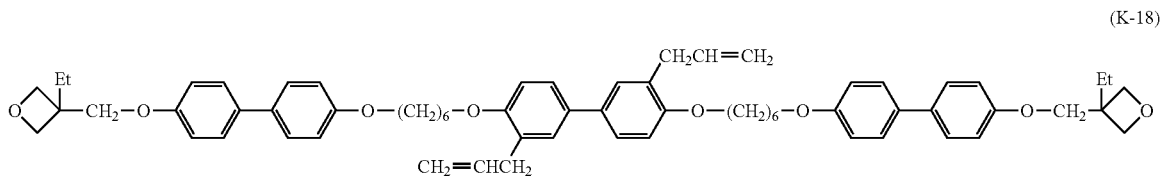
(K-18)

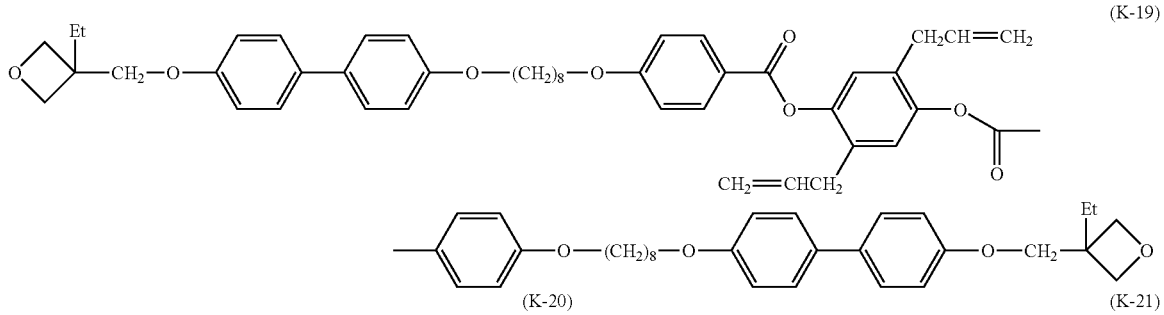
(K-19)

(K-20)

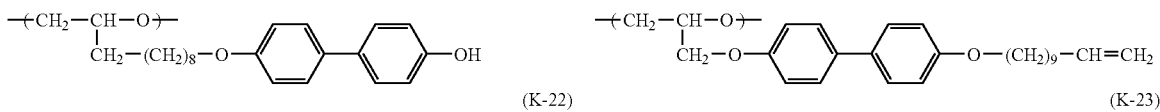
(K-21)

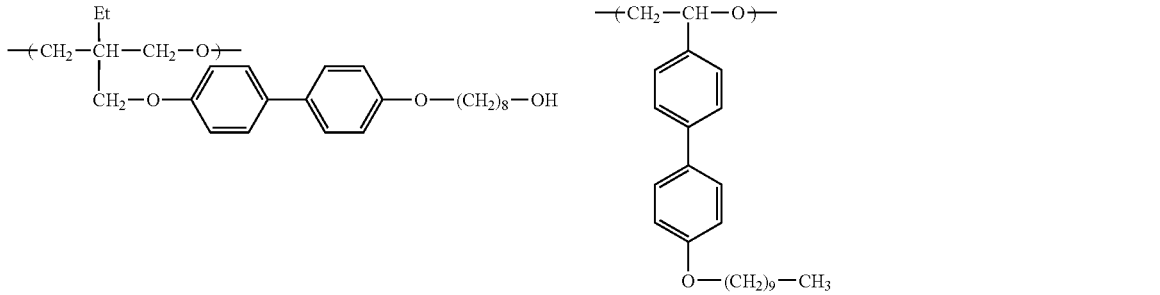
(K-22)

(K-23)

(K-24)

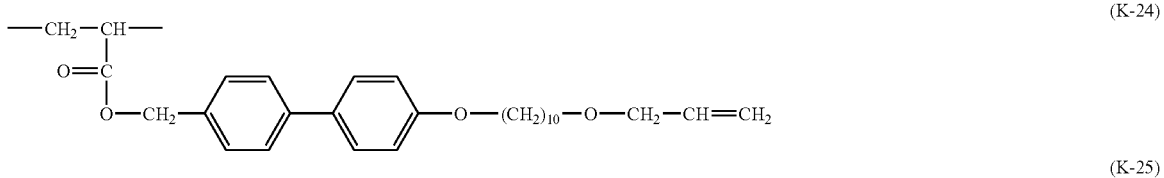
(K-25)

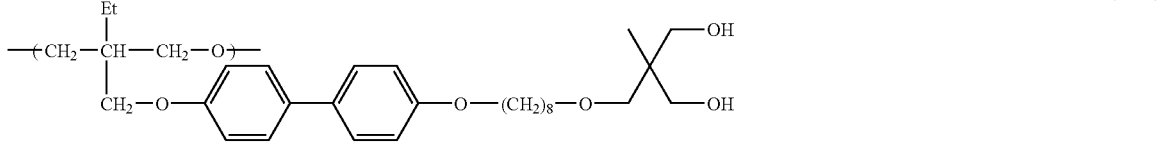

[2-3] Addition of Other Organosilicon Compound:

If desired, any other metal alkoxide and silicon compound may be added to the hybrid material of the invention for improving the characteristics of the material. These function, for example, as a crosslinking agent, and the crosslinked material may thereby hold a large amount of acid. In addition, they may form a complex with the precursor, organosilicon compound to thereby enhance the flexibility and the strength of the material. Preferably, the metal alkoxide is an alkoxide with Al, Ti, Zr or the like. Preferred examples of the silicon compound are organosilicon compounds of the following formula (1-3), and their polymers.

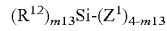  (1-3)

In formula (1-3), $R^{12}$ represents a substituted or unsubstituted alkyl, aryl or heterocyclic group; $Z^1$ represents a halogen atom (e.g., chlorine, bromine, iodine), or $OR^{15}$; $R^{15}$ represents a hydrogen atom, an alkyl group, an aryl group, or a silyl group; $m^{13}$ indicates an integer of from 0 to 4; when $m^{13}$ and/or 4-$m^{13}$ is 2 or more, then $R^{12}$'s and Z1's may be the same or different; and $R^{12}$'s or the substituents of $R^{12}$'s may bond to each other to form a polymer.

$R^{12}$ and $Z^1$ in formula (1-3) have the same meanings as $R^{11}$ and $X^1$ in formula (1-1). $m^{13}$ is preferably 0 or 1; $Z^1$ is preferably $OR^{15}$; $R^{15}$ is preferably an alkyl group. When $m^{13}$ is 0, preferred examples of the compound are tetramethoxysilane (TMOS) and tetraethoxysilane (TEOS). When $m^{13}$ is 1, preferred examples of the compounds are mentioned below.

porous polypropylene, porous polytetrafluoroethylene, porous crosslinked heat-resistant polyethylene and porous polyimide films.

During the sol-gel reaction of the precursor, organosilicon compound that goes on after the sol-gel reaction mixture has been applied onto supports, the organic site of the organosilicon compound is oriented. For promoting the orientation of the sol-gel composition, various methods may be employed. For example, the supports may be previously subjected to

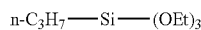  (X-1)
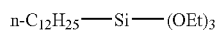  (X-3)

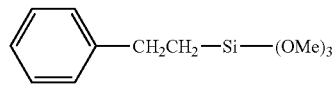

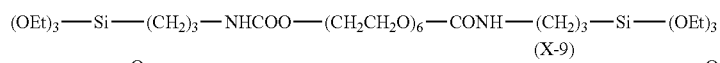

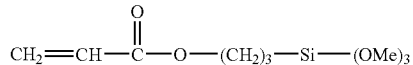

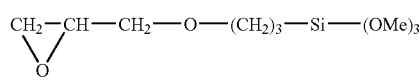

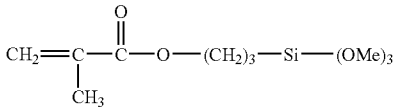

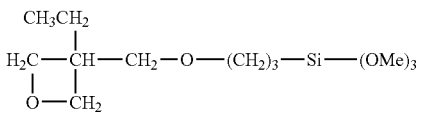

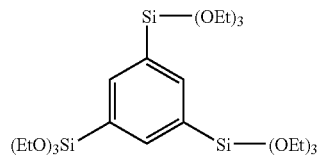

When the compound of formula (1-3) is combined with the precursor, organosilicon compound, then its amount is preferably from 1 to 50 mol %, more preferably from 10 to 25 mol % relative to the precursor.

[2-4] Method of Film Formation:

The supports to which the sol-gel reaction mixture is applied in the invention are not specifically defined, and their preferred examples are glass substrates, metal substrates, polymer films and reflectors. Examples of the polymer films are cellulose polymer films of TAC (triacetyl cellulose), ester polymer films of PET (polyethylene terephthalate) or PEN (polyethylene naphthalate), and fluoropolymer films of PTFE (polytrifluoroethylene). Any known method of, for example, curtain coating, extrusion coating, roll coating, spin coating, dipping, bar coating, spraying, slide coating or printing is herein employable for applying the sol-gel reaction mixture to the supports.

The sol-gel reaction mixture may be applied onto a porous substrate to form a film thereon; or a porous substrate may be dipped in the sol-gel reaction mixture so as to make the pores of the substrate filled with a proton-conductive material to form a film. Preferred examples of such a porous substrate are orientation treatment. For the orientation treatment, any ordinary method may be employed. Preferably, for example, an oriented liquid-crystal layer of various oriented polyimide films, oriented polyvinyl alcohol films or the like is formed on a support, and this is rubbed for orientation; or the sol-gel composition on a support is exposed to a magnetic field or an electric field, or it is heated.

Regarding the orientation condition of the organic-inorganic hybrid proton-conductive membrane, it is confirmed through observation with a polarizing microscope that the membrane is optically anisotropic. The direction in which the membrane sample is observed may be any one, not specifically defined. For example, when the sample rotated in a cross-Nicol condition gives changing dark and light shadows, then it can be said that the sample is anisotropic. The orientation condition of the membrane is not specifically defined provided that the membrane shows anisotropy. When a texture that can be recognized as a liquid-crystal phase is observed in the membrane sample, then the phase may be specifically identified. In this case, the phase may be any of lyotropic liquid-crystal phase, or a thermotropic liquid-crystal phase, or even any other phase. Regarding its orientation condition, the lyotropic liquid-crystal phase is preferably a hexagonal phase, a cubic phase, a lamella phase, a sponge phase or a micelle phase. Especially at room temperature, preferred is a lamella phase or a sponge phase. The thermotropic liquid-crystal phase is preferably any of a nematic phase, a smectic phase, a crystal phase, a columnar phase and a cholesteric phase. Especially at room temperature, preferred are a smectic phase and a crystal phase. Also preferably, these phase may be oriented and fixed in solid. Anisotropy as referred to herein means that the directional vector of molecules is not isotropic.

The thickness of the proton-conductive membrane of the invention is preferably from 10 to 500 μm, more preferably from 25 to 100 μm.

[2-5] Addition of Inorganic Filler:

For further improving the characteristics (e.g., mechanical strength, ionic conductivity) of the membrane, inorganic particles (inorganic filler) may be added to the membrane. For the inorganic particles, preferred are inorganic oxides such as silica (silicon oxide), aluminium oxide, zinc oxide, magnesium oxide, titanium oxide. Two or more of these may be mixed for use herein. Regarding the particle size of the inorganic particles, the mean particle size of the primary particles thereof is preferably at most 500 nm, more preferably at most 200 nm, even more preferably from 2 to 200 nm. The inorganic particles may be crystalline or amorphous, and may also be mixtures of crystalline and amorphous particles.

The inorganic particles may be surface-treated with dimethylsilicone oil, silane coupling agent or the like. For example, for silica, the amorphous silica surface of which the essential component is powdery silicon dioxide may be processed with a methyl group, an octylsilyl group or a trimethylsilyl group, and the resulting hydrophobic amorphous silica may be used herein.

[2-6] Polymerizing Group (e.g., Polymerization of $R^{23}$):

When the polymerizable group $R^{23}$ is a carbon-carbon unsaturated bond, for example, a (meth)acryloyl, vinyl or ethynyl group, then radical polymerization of an ordinary polymer production may apply to the case. The process is described in Takayuki Ohtsu & Masaetsu Kinoshita, *Experimental Process for Polymer Production* (by Kagaku Dojin), and Takayuki Ohtsu, *Lecture of Polymerization Theory* 1, Radical Polymerization (I) (by Kagaku Dojin). The radical polymerization includes thermal polymerization with a thermal polymerization initiator and photopolymerization with a photopolymerization initiator. Preferred examples of the thermal polymerization initiator are azo-type initiators such as 2,2'-azobis(isobutyronitrile), 2,2'-azobis(2,4-dimethylvaleronitrile), dimethyl 2,2'-azobis(2-methylpropionate); and peroxide-type initiators such as benzoyl peroxide. Preferred examples of the photopolymerization initiator are α-carbonyl compounds (U.S. Pat. Nos. 2,367,661 and 2,367,670), acyloin ethers, α-hydrocarbon-substituted aromatic acyloin compounds (U.S. Pat. No. 2,722,512), polynuclear quinone compounds (U.S. Pat. Nos. 3,046,127 and 2,951,758), combinations of triarylimidazole dimer and p-aminophenyl ketone, acridine and phenazine compounds (JP-A 60-105667, U.S. Pat. No. 4,239,850), and oxadiazole compounds (U.S. Pat. No. 4,212,970).

The polymerization initiator may be added to the reaction system before the start of the sol-gel reaction, or may be added to the reaction product after the sol-gel reaction and immediately before the application of the reaction product to substrates. Preferably, the amount of the polymerization initiator to be added is from 0.01 to 20% by mass, more preferably from 0.1 to 10% by mass relative to the total amount of the monomers.

When $R^{23}$ is an alkyleneoxide group such as an ethyleneoxide or trimethyleneoxide group, then the polymerization catalyst to be used in the case may be a proton acid (as in the above (2-1)), or a Lewis acid (preferably, boron trifluoride (including its ether complexes), zinc chloride, aluminium chloride). In case where the proton acid used in the sol-gel reaction serves also as the polymerization catalyst, then it does not require any additional proton acid specifically for the polymerization of the group $R^{23}$. When used, the polymerization catalyst is preferably added to the reaction product just before the product is applied to substrates. In general, the polymerization is promoted in the membrane being formed on substrates through exposure to heat or light. As a result, the molecular orientation condition is fixed, and the strength of the membrane formed is thereby enhanced.

[2-7] Addition of Polymer Compound:

The proton-conductive membrane of the invention may contain various polymer compounds for the purpose of (1) enhancing the mechanical strength of the membrane, and (2) increasing the acid concentration in the membrane.

(1) For enhancing the mechanical strength of the membrane, preferably added thereto is a polymer compound having a molecular weight of from 10,000 to 1,000,000 and well compatible with the proton-conductive material of the invention. For example, the polymer compound includes perfluoropolymer, polystyrene, polyethylene glycol, polyoxetane, poly(meth)acrylate, polyether ketone, polyether sulfone and their copolymers. Preferably, the polymer content of the membrane is from 1 to 30% by mass.

(2) For increasing the acid concentration in the membrane, preferably used herein are proton acid segment-having polymer compounds, for example, perfluorocarbonsulfonic acid polymers such as typically Nafion®, poly(meth)acrylates having a phosphoric acid group in side branches, and sulfonated, heat-resistant aromatic polymers such as sulfonated polyether-ether ketones, sulfonated polyether sulfones, sulfonated polysulfones, sulfonated polybenzimidazoles. The content of the polymer compound in the membrane is preferably from 1 to 30% by mass.

[2-8] Addition of Catalyst Metal to Proton-Conductive Membrane:

An active metal catalyst may be added to the proton-conductive membrane of the invention for promoting the redox reaction of anode fuel and/or cathode fuel. The fuel having penetrated into the proton-conductive membrane that contains the catalyst may be well consumed inside the proton-conductive membrane, not reaching any other electrode, and this is effective for preventing crossover. The active metal for the catalyst is not specifically defined provided that it functions as an electrode catalyst. For it, for example, preferred is platinum or platinum-based alloy.

[3] Fuel Cell:

Fuel cells using organic-inorganic hybrid material, as the proton-conductive material, according to the present invention will be explained.

[3-1] Structure of the Cell:

FIG. 1 shows a membrane electrode assembly 10 (hereinafter referred to as "MEA") for use in fuel cells. The MEA 10 comprises a proton-conductive membrane 11, and a cathode 12 and an anode 13 that are opposite to each other via the membrane 11.

The cathode 12 and the anode 13 each comprise a porous conductive material (e.g., carbon paper) 12a, 13a, and a catalyst layer 12b, 13b. The catalyst layer is formed of a dispersion of carbon particles (e.g., ketjen black, acetylene black, carbon nanotube) that carry a catalyst metal such as platinum particles thereon, in a proton-conductive material (e.g., Nafion). For airtightly adhering the catalyst layers 12b, 13b to the proton-conductive membrane 11, generally employed is a method of hot-pressing the porous conductive materials 12a, 13a each coated with the catalyst layer 12b, 13b, against the proton-conductive membrane 11 (preferably at 120 to 130° C. under 2 to 100 kg/cm$^2$); or a method of pressing the catalyst layers 12b, 13b each formed on a suitable support, against the proton-conductive membrane 11 while transferring the layers onto the membrane, followed by making the resulting laminate structure sandwiched between the porous conductive materials 12a, 13a.

Figure 2:
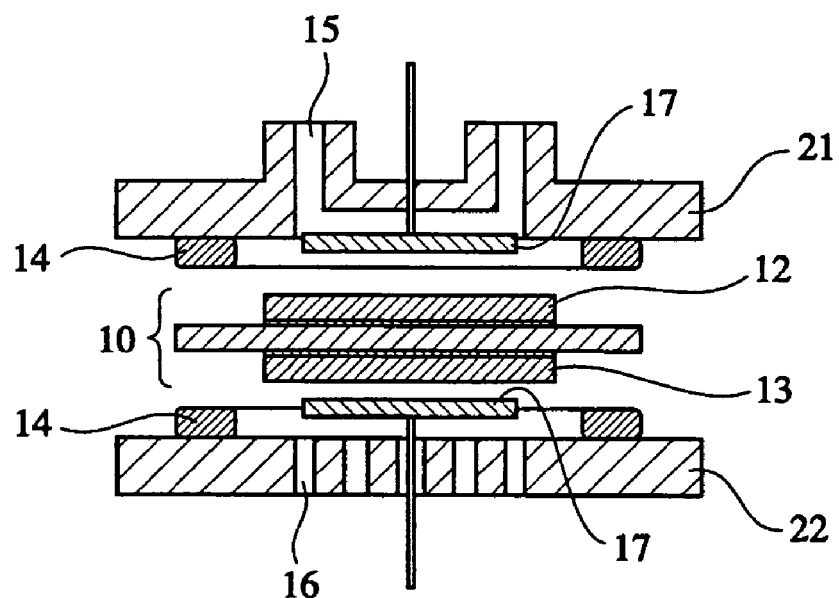
FIG. 2 is an exploded cross-sectional view showing one example of the constitution of the fuel cell of the invention.

FIG. 2 shows one example of a unit cell of a fuel cell. The fuel cell comprises the MEA 10, a pair of separators 21, 22 between which the MEA 10 is sandwiched, and a collector 17 of a stainless net and a gasket 14 both fitted to the separators 21, 22. The cathode-side separator 21 has a cathode-side opening 15 formed through it; and the anode-side separator 22 has an anode-side opening 16 formed through it. Vapor fuel such as hydrogen or alcohol (e.g., methanol) or liquid fuel such as aqueous alcohol solution is fed to the cell via the cathode-side opening 15; and an oxidizing gas such as oxygen gas or air is thereto via the anode-side opening 16.

[3-2] Catalyst Material:

For the anode and the cathode, for example, a catalyst that carries active metal particles of platinum or the like on a carbon material may be used. The particle size of the active metal particles that are generally used in the art is preferably from 2 to 10 nm. The particles having a particle size of not larger than 10 nm may have a large surface area per the unit mass, and their activity may be high. On the other hand, the particles having a particle size of not smaller than 2 nm are easy to disperse with no aggregation.

In hydrogen-oxygen fuel cells, the active polarization of cathode (air electrode) is higher than that of anode (hydrogen electrode). This is because the cathode reaction (oxygen reduction) is slow as compared with the anode reaction. For enhancing the oxygen electrode activity, usable are various platinum-based binary alloys such as Pt—Cr, Pt—Ni, Pt—Co, Pt—Cu, Pt—Fe. In a direct methanol fuel cell in which aqueous methanol is used for the anode fuel, it is a matter of importance that the catalyst poisoning with CO that is formed during methanol oxidation must be inhibited. For this purpose, usable are platinum-based binary alloys such as Pt—Ru, Pt—Fe, Pt—Ni, Pt—Co, Pt—Mo, and platinum-based ternary alloys such as Pt—Ru—Mo, Pt—Ru—W, Pt—Ru—Co, Pt—Ru—Fe, Pt—Ru—Ni, Pt—Ru—Cu, Pt—Ru—Sn, Pt—Ru—Au.

For the carbon material that carries the active metal thereon, preferred are acetylene black, Vulcan XC-72, ketjen black, carbon nanohorn (CNH), carbon nanotube (CNT).

[3-3] Constitution and Material of Catalyst Layer:

The function of the catalyst layer includes (1) transporting fuel to active metal, (2) providing the reaction site for oxidation of fuel (anode) and for reduction thereof (cathode), (3) transmitting the electrons formed through the redox reaction to collector, and (4) transporting the protons formed through the reaction to proton-conductive membrane. For (1), the catalyst layer must be porous so that liquid and vapor fuel may penetrate into the depth thereof. The active metal catalyst described in [3-2] acts for (2); and the carbon material also described in [3-2] acts for (3). For attaining the function of (4), the catalyst layer shall contain a proton-conductive material added thereto.

The proton-conductive material to be in the catalyst layer is not specifically defined provided that it is a solid that has a proton-donating group. For it, for example, preferred are acid reside-having polymer compounds that are used for the proton-conductive membrane (e.g., perfluorocarbonsulfonic acids such as typically Nafion; phosphoric acid-branched poly(meth)acrylates; sulfonated, heat-resistant aromatic polymers such as sulfonated polyether-etherketones, sulfonated polybenzimidazoles), and acid-fixed organic-inorganic hybrid proton-conductive materials (e.g., proton-conductive materials described in JP-A 10-69817, 11-203936, 2001-307752, and Japanese Patent No. 3,103,888). As the case may be, the proton-conductive material that is obtained through sol-gel reaction of the precursor for the proton-conductive membrane of the invention may also be used for the catalyst layer. This is favorable since the material is of the same type as the proton-conductive membrane the adhesiveness between the proton-conductive membrane and the catalyst layer is high.

The amount of the active metal to be used herein is preferably from 0.03 to 10 mg/cm$^2$ from the viewpoint of the cell output and from the economical viewpoint. The amount of the carbon material that carries the active metal is preferably from 1 to 10 times the mass of the active metal. The amount of the proton-conductive material is preferably from 0.1 to 0.7 times the mass of the active metal-carrying carbon.

[3-4] Porous Conductive Sheet (Electrode Substrate):

The porous conductive sheet may be referred to as an electrode substrate, a diffusive layer or a lining material, and it acts as a collector and also acts to prevent water from staying therein to worsen vapor diffusion. In general, carbon paper or carbon cloth may be used for the sheet. If desired, the sheet may be processed with PTFE so as to be repellent to water.

[3-5] Formation of MEA (Membrane Electrode Assembly):

For forming MEA, for example, employable are the following methods:

(1) Proton-conductive membrane coating method: A catalyst paste (ink) that comprises basic ingredients of active metal-carrying carbon, proton-conductive material and solvent is directly applied onto both sides of a proton-conductive membrane, and a porous conductive sheet is (thermally) adhered under pressure thereto to construct a 5-layered MEA.

(2) Porous conductive sheet coating method: The catalyst paste is applied onto the surface of a porous conductive sheet to form a catalyst layer thereon, and a proton-conductive membrane is adhered thereto under pressure to construct a 5-layered MEA.

(3) Decal method: The catalyst paste is applied onto PTFE to form a catalyst layer thereon, and the catalyst layer alone is transferred to a proton-conductive membrane to construct a 3-layered MEA. A porous conductive sheet is adhered thereto under pressure to construct a 5-layered MEA.

(4) Catalyst post-carrying method: Ink prepared by mixing a platinum powder-carrying carbon material and a proton-conductive material is applied onto a proton-conductive membrane, a porous conductive sheet or PTFE to form a film, and platinum ions are infiltrated into the film and platinum particles are precipitated in the film through reduction to thereby form a catalyst layer. After the catalyst layer is formed, it is processed according to the method of (1) to (3) to construct MEA.

[3-6] Fuel and Method of Fuel Supply:

Fuel for fuel cells that comprise a solid polymer membrane is described. For anode fuel, usable are hydrogen, alcohols (e.g., methanol, isopropanol, ethylene glycol), ethers (e.g., dimethyl ether, dimethoxymethane, trimethoxymethane), formic acid, boron hydride complexes, ascorbic acid, etc. For cathode fuel, usable are oxygen (including oxygen in air), hydrogen peroxide, etc.

In direct methanol fuel cells, the anode fuel may be aqueous methanol having a methanol concentration of from 3 to 64% by mass. As in the anode reaction formula ($CH_3OH+H_2O \rightarrow CO_2+6H^++6e$), 1 mol of methanol requires 1 mol of water, and the methanol concentration in the case corresponds to 64% by mass. A higher metal concentration in fuel is more effective for reducing the mass and the volume of the cell including the fuel tank of the same energy capacity. On the other hand, a lower metal concentration in fuel is more effective for preventing methanol from penetrating through the proton-conductive membrane to react with oxygen on the cathode side to thereby lower the voltage, or that is, for preventing the crossover phenomenon, and as a result, the output is prevented from lowering. To that effect, the optimum concentration of methanol shall be determined, depending on the methanol perviousness of the proton-conductive membrane used. The cathode reaction formula in direct methanol fuel cells is ($3/2 O_2+6H^++6e \rightarrow H2O$), and oxygen (e.g., oxygen in air) is used for the fuel in the cells.

For supplying the anode fuel and the cathode fuel to the respective catalyst layers, for example, employable are two methods, (1) a method of forcedly circulating the fuel by the use of an auxiliary device such as pump (active method), and (2) a method not using such an auxiliary device (for example, liquid fuel is supplied through capillarity or by spontaneously dropping it, and vapor fuel is supplied by exposing the catalyst layer to air-passive method). In the method (1), water formed from the cathode fuel is circulated, and high-concentration methanol is usable as fuel. In this, air supply enables high output from the cells. However, the fuel supply unit will make it difficult to down-size the cells. On the other hand, the method (2) will make it possible to down-size the cells. In this, however, the fuel supply rate is readily limited and high output from the cells is often difficult. Preferably, therefore, the methods (1) and (2) are combined for the anode fuel and the cathode fuel.

[3-7] Cell Stacking:

The unit cell voltage of fuel cells is generally at most 1 V. Therefore, it is preferable that cells are stacked up in series, depending on the necessary voltage for load. For cell stacking, for example, employable are (1) a method of "plane stacking" that comprises placing unit cells on a plane, and (2) a method of "bipolar stacking" that comprises stacking up unit cells via a separator with a fuel pathway formed on both sides thereof. In the plane stacking, the cathode (air electrode) is on the surface of the stacked structure and it may readily take air thereinto. In this, since the stacked structure may be thinned, it is more favorable for small-sized fuel cells. Apart from these, MEMS may be employed, in which a silicon wafer is processed to form a micropattern and fuel cells are stacked on it.

[4] Fuel Cell Application:

Fuel cells may have many applications, for example, for automobiles, electric and electronic appliances for household use, mobile devices, portable devices, etc. In particular, direct methanol fuel cells may be down-sized, the weight thereof may be reduced and they do not require charging. Having such many advantages, therefore, they are expected to be used for various energy sources. For example, they may be used for mobile phones, mobile notebook-size personal computers, electronic still cameras, PDA, video cameras, mobile game drivers, mobile servers, wearable personal computers, mobile displays, portable generators, outdoor lighting devices, pocket lamps, electrically-powered (or assisted) bicycles, etc. In addition, they are also favorable for power sources for robots for industrial and household use and for other tools. Moreover, they are further usable as power sources for charging secondary batteries that are mounted on these appliances.

EXAMPLES

The invention is described in more detail with reference to the following Examples, to which, however, the invention is not limited.

Production Example 1-1

A precursor (S-1-1) was produced according to the following reaction scheme:

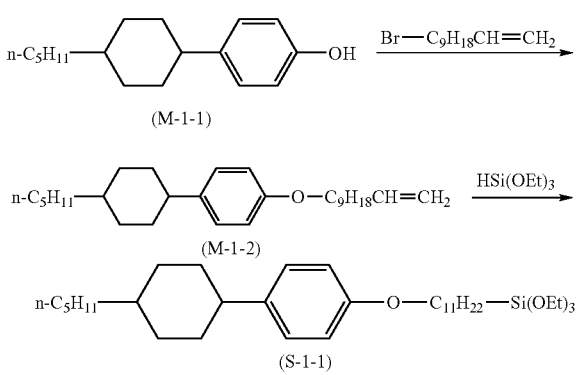

(1) Production of Intermediate (M-1-2):

P-(trans-4-pentylcyclohexyl)phenol (M-1-1, by Kanto Chemical) (24.6 g, 100 mmols) was dissolved in 100 ml of DMF, and 25 g of potassium carbonate was added thereto. With stirring it under heat at 80° C., 11-bromo-1-undecene (24.5 g, 105 mmols) was dropwise added there to over a period of 10 minutes. Further stirred under heat for 3 hours, the reaction mixture was poured into 300 ml of water, and the crystal formed was collected. The crude crystal thus obtained was recrystallized from methanol, and 36.4 g of an intermediate (M-1-2) was obtained.

(2) Production of (S-1-1):

(M-1-2) (3.99 g, 10 mmols) and triethoxysilane (1.8 g, 11 mmols) were dissolved in toluene, and the reactor was purged with nitrogen. The reaction liquid was kept at 80° C., and chloroauric acid (5 mg) was added thereto and heated for 3 hours. The reaction mixture was concentrated and purified through silica gel column chromatography to obtain 1.1 g of a colorless oil (S-1-1).

Production Example 1-2

A precursor (S-1-4) was produced according to the following reaction scheme:

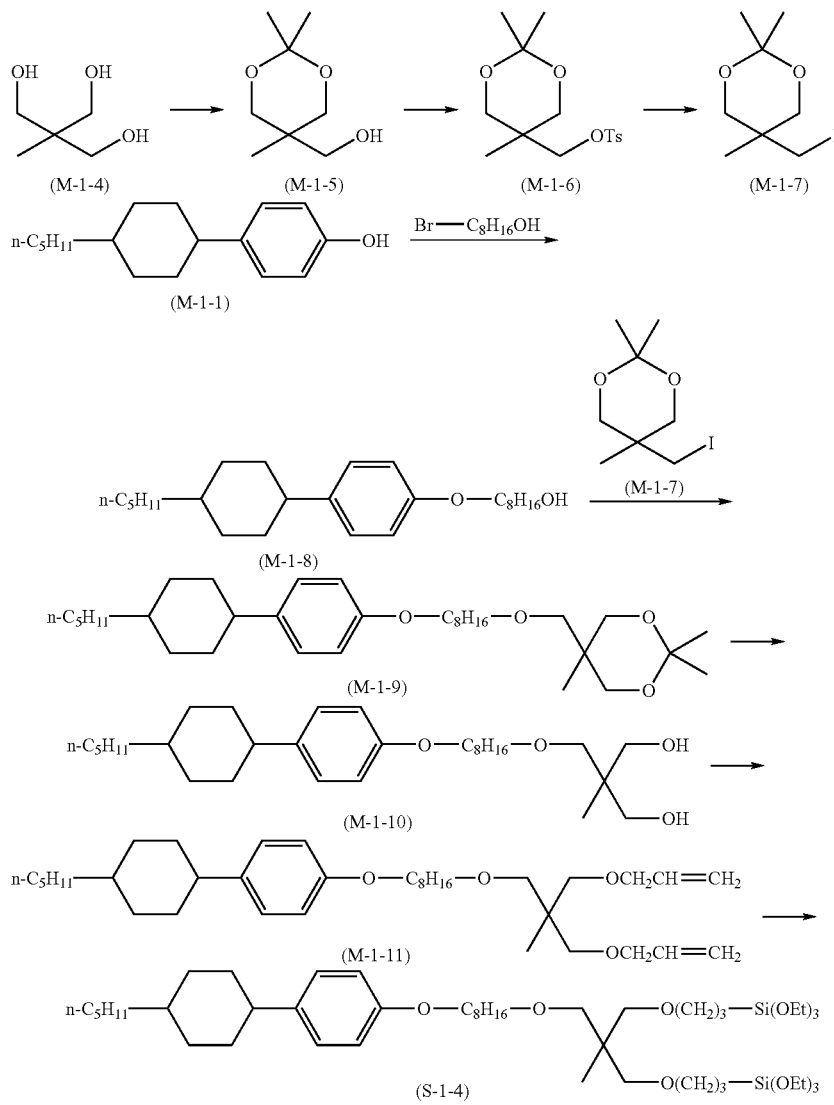

(1) Production of Intermediate (M-1-7):

1,1,1-Tris-hydroxymethylethane (M-1-4) (100 g, 833 mmols) and 2,2-dimethoxypropane (100 g, 917 mmols) were dissolved in 750 ml of chloroform, and 1 g of p-toluenesulfonic acid hydrate was added thereto. Using a Soxhlet extractor equipped with Molecular Sieves 3A, this was heated under reflux for 7 hours. 4 g of potassium carbonate was added to the reaction mixture, and this was stirred at room temperature for 20 minutes. The reaction mixture was filtered and concentrated to obtain 136 g of a colorless oil (M-1-5). Thus obtained, (M-1-5) (135 g, 833 mmols) was dissolved in 400 ml of THF, and 143 ml of triethylamine and 5 g of dimethylaminopyridine were added thereto. At room temperature, paratoluenesulfonyl chloride (178 g, 916 mmols) was added to it. The reaction mixture was heated under reflux for 6 hours, and water was added thereto. Then, this was extracted with ethyl acetate. After concentrated, the resulting residue was crystallized in n-hexane to obtain 225 g of (M-1-6). Thus obtained, (M-1-6) (201 g, 639 mmols) was dissolved in 700 ml of acetonitrile, and sodium iodide (290 g) was added thereto and heated under reflux for 2 hours. The reaction mixture was filtered to remove the inorganic matter, and water was added to it. Then, this was extracted with ethyl acetate. The extract was concentrated, and the residue was distilled under reduced pressure to collect a fraction at 75 to 85° C. under 0.5 mmHg. 129 g of (M-1-7) was thus obtained.

(2) Production of Intermediate (M-1-8):

P-(trans-4-pentylcyclohexyl)phenol (M-1-1, by Kanto Chemical) (12.3 g, 50 mmols) was dissolved in 50 ml of DMF, and 10 g of potassium carbonate was added thereto. With stirring it under heat at 80° C., 8-bromo-octanol (8.6 g, 52.5 mmols) was dropwise added thereto over a period of 5 minutes. Further stirred under heat for 3 hours, the reaction mixture was poured into 100 ml of water, and the crystal formed was collected. The crude crystal thus obtained was recrystallized from cold methanol, and 14.4 g of (M-1-8) was obtained.

(3) Production of Intermediate (M-1-11):

(M-1-8) (25 g, 66.7 mmols) was dissolved in 100 ml of DMSO, and sodium hydride (with 30% liquid paraffin added thereto) (3.5 g) was added to it, and stirred at room temperature for 20 minutes. (M-1-7) (19.8 g, 73.4 mmols) was dropwise added to it. After the addition, this was stirred at 60° C. for 4 hours, and then the reaction liquid was poured into water with ice, and extracted with ethyl acetate. After this was concentrated, the residue was purified through silica gel column chromatography to obtain 26.7 g of (M-1-9). Thus obtained, 26.7 g of (M-1-9) was dispersed in a mixed solution of 70 ml of ethanol and 50 ml of concentrated hydrochloric acid, and heated under reflux for 30 minutes. The reaction liquid was poured into 500 ml of water, and the crystal precipitated was collected. This was dried to obtain 24 g of (M-1-10). Next, (M-1-10) (20.4 g, 428 mmols) was dissolved in 100 ml of DMF, and sodium hydride (with 30% liquid paraffin added thereto) (5.16 g, 1284 mmols) was added to it, and then allyl iodide (21.4 g, 1284 mmols) was dropwise added thereto at room temperature. The reaction liquid was heated at 60° C. for 5 hours, and then poured into water with ice, and extracted with ethyl acetate. The extract was concentrated and the residue was purified through silica gel column chromatography to obtain 20.3 g of (M-1-11).

(4) Production of (S-1-4):

(M-1-11) (14.5 g, 26 mmols) obtained in the above, and triethoxysilane (12.8 g, 78 mmols) were dissolved in toluene, and 10 mg of chloroauric acid was added thereto in a nitrogen atmosphere at 80° C. After reacted at 85° C. for 3 hours, the reaction mixture was concentrated and purified through silica gel column chromatography to obtain 5.6 g a colorless oil (S-1-4).

Production Example 1-3

A precursor (S-1-12) was produced according to the following reaction scheme:

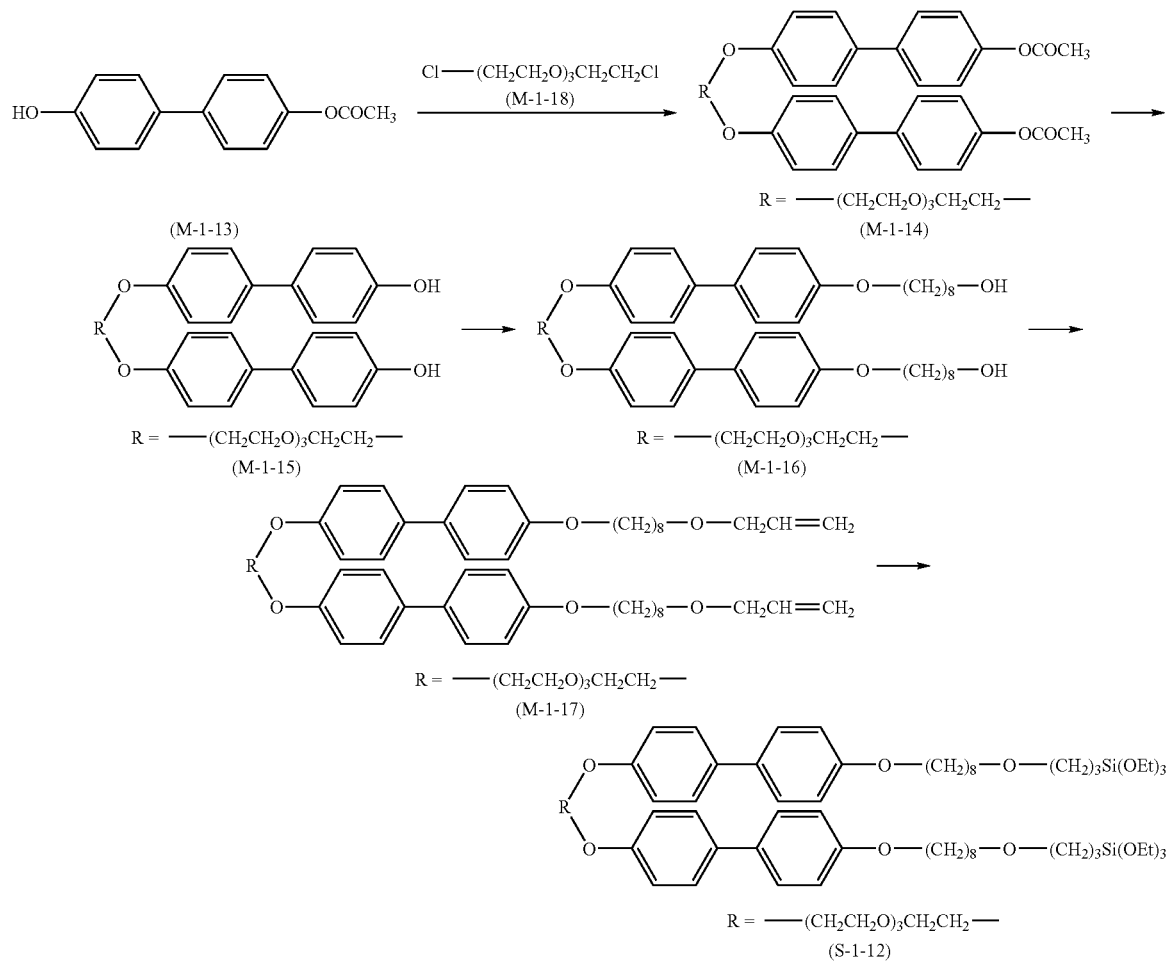

(1) Production of (M-1-15):

4,4'-Dihydroxy-biphenyl monoacetylate (M-1-13) (22.8 g, 100 mmols) was dissolved in 100 ml of DMF, to which was added 25 g of potassium carbonate and stirred under heat at 80° C. To it, dropwise added was a dichloride (M-1-18) (10.85 g, 50 mmols) over a period of 10 minutes. This was stirred at 80° C. for 5 hours, and the reaction mixture was poured into 200 ml of water. The crystal precipitated was collected through filtration. This was recrystallized from acetonitrile/ethyl acetate, and 58 g of (M-1-14) was obtained.

(M-1-14) (31.4 g, 50 mmols) was dispersed in a solution of 100 ml of methanol, 50 ml of water and 8 g of sodium hydroxide, and heated under reflux for 2 hours. Then, this was poured into 100 ml of water and neutralized with hydrochloric acid. The crystal precipitated was taken out through filtration and dried to obtain 26 g of (M-1-15).

(2) Production of (M-1-17):

Thus obtained, (M-1-15) (13.3 g, 25 mmols) was dissolved in 40 ml of DMF, and 12 g of potassium carbonate was added thereto. Then, 8-chloro-1-octanol (8.23 g, 50 mmols) was added to it and stirred under heat at 80° C. for 6 hours. The reaction liquid was poured into 100 ml of water, and the crystal formed was collected through filtration and recrystallized from methanol to obtain 15.7 g of (M-1-16). (M-1-16) (10 g, 12.7 mmols) was dissolved in 30 ml of DMSO, to which was added sodium hydride (with 30% liquid paraffin added thereto) (1 g). At room temperature, allyl iodide (4.7 g, 28 mmols) was dropwise added to it, and stirred under heat at 50° C. for 3 hours. The reaction liquid was poured into water, and extracted with ethyl acetate. The extract was concentrated and then purified through silica gel column chromatography to obtain 7 g of (M-1-17).

(3) Production of (S-1-12):

(M-1-17) (5 g, 5.8 mmols) thus obtained, and tetraethoxysilane (2.3 g, 14 mmols) were dissolved in toluene, and heated in a nitrogen atmosphere at 80° C., to which was added 10 mg of chloroauric acid. This was stirred under heat at 80 to 90° C. for 4 hours, and the reaction liquid was concentrated and purified through silica gel column chromatography to obtain 2.1 g of (S-1-12).

Production Example 2-1

A precursor (S-2-1) was produced according to the following reaction scheme:

(1) Production of Intermediate (M-2-3):

4,4'-Dihydroxy-biphenyl monoacetylate (M-2-1) (45.6 g, 200 mmols) was dissolved in 1000 ml of DMF, to which was added 20 g of potassium carbonate. 11-Bromo-1-undecene (47.2 g, 200 mmols) was dropwise added to it. The reaction liquid was heated at 80° C. for 5 hours, then cooled to room temperature, and poured into water. The crystal precipitated was collected through filtration. The crude crystal was washed with hot methanol, and dried to obtain 72 g of (M-2-2). (M-2-2) (50.8 g, 133.5 mmols) was dispersed in 100 ml of methanol, to which was added aqueous potassium hydroxide solution (KOH 12 g/water 10 ml), and heated at 40° C. for 1 hour and then at 80° C. for 20 minutes. Then, the reaction liquid was poured into water, and the crystal precipitated was taken out through filtration, washed with hot methanol and dried to obtain 44 g of (M-2-3).

(2) Production of Intermediate (M-2-5):

(M-2-3) (20.3 g, 60 mmols) was dissolved in 400 ml of methylene chloride, to which was added 120 ml of aqueous 0.5 M sodium hydrogencarbonate solution. With stirring it, m-chloroperbenzoic acid (purity 69%, 16.5 g, 66 mmols) was added to it over a period of 10 minutes. This was further stirred for 7 hours, and water and a small amount of sodium hydrogensulfite were added to the reaction liquid. Then, this was washed with water, and methylene chloride was evaporated away to obtain a crude crystal. The crude crystal was washed with hot acetonitrile to obtain 12 g of (M-2-4). (M-2-4) (11 g, 31 mmols) was dissolved in 50 ml of dimethylformamide, to which was added 10 g of potassium carbonate. With stirring it, allyl iodide (5.2 g, 31 mmols) was dropwise added thereto. This was further stirred at room temperature for 2 hours, and then at 50° C. for 1 hour. The reaction liquid was poured into water, and the crystal precipitated was recrystallized from methanol to obtain 12.1 g of (M-2-5).

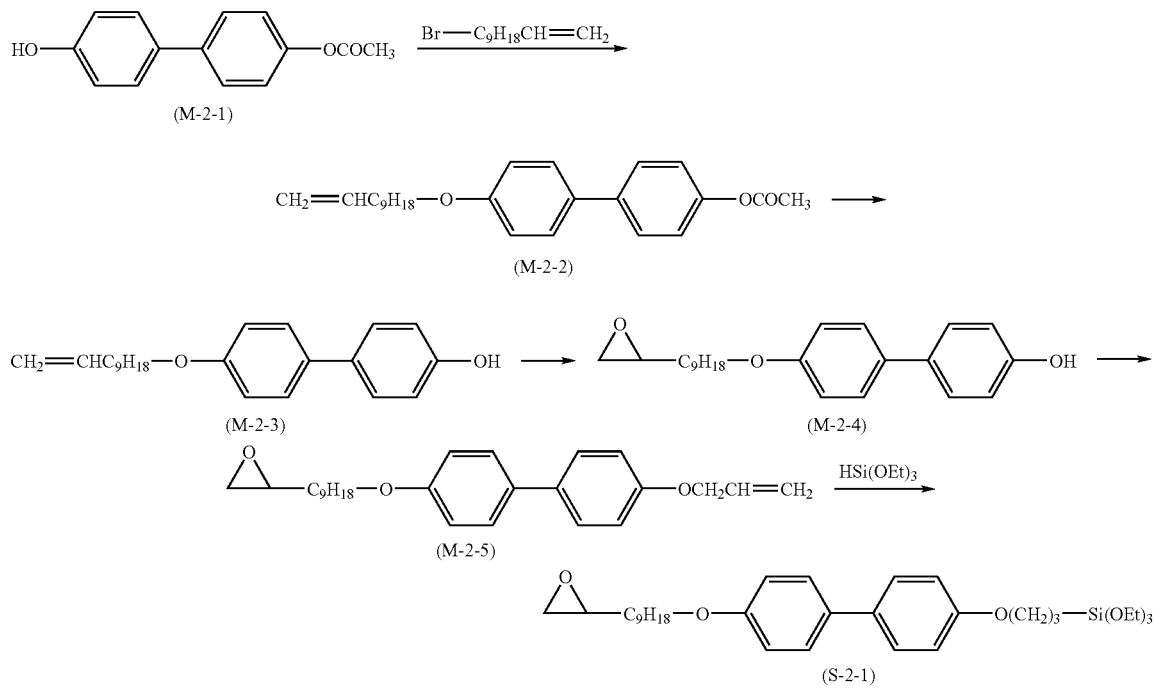

(3) Production of (S-2-1):

(M-2-5) (5 g, 12.7 mmols) and triethoxysilane (3.13 g, 19.05 mmols) were dissolved in 50 ml of toluene and 5 ml of isopropanol, to which was added 10 mg of chloroauric acid in a nitrogen atmosphere at 80° C. The reaction liquid was kept at 80 to 90° C. for 1 hour to react the compounds, and the solvent was evaporated away. The residue was purified through silica gel column chromatography to obtain 3.2 g of (S-2-1).

Production Example 2-2

A precursor (S-2-4) was produced according to the following reaction scheme:

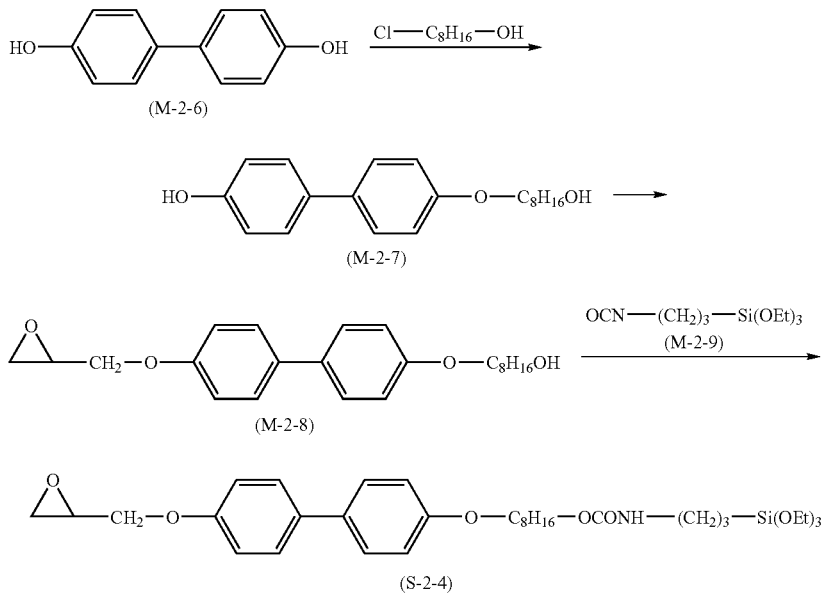

(1) Production of Intermediate (M-2-8):

4,4'-Dihydroxybiphenyl (M-2-6) (76.2 g, 410 mmols) was dissolved in 400 ml of dimethylacetamide, to which were added potassium carbonate (42.2 g) and potassium iodide (24.1 g). 8-Chloroctanol (47.2 g, 287 mmols) was added to it. The reaction mixture was stirred at 110° C. for 5 hours, and then cooled to room temperature. Then, this was poured into water, and the crystal precipitated was taken out through filtration. The resulting crude crystal was recrystallized from acetonitrile to obtain 63.8 g of (M-2-7). Thus obtained, (M-2-7) (10 g. 31.8 mmols) was dissolved in 40 ml of dimethylacetamide, to which was added potassium carbonate (3.3 g). With stirring it at 50° C., epichlorohydrin (3.24 g, 35 mmols) was dropwise added thereto. This was reacted at 80° C. for 3 hours, and the reaction mixture was poured into water. The resulting crude crystal was recrystallized twice from acetonitrile to obtain 8.2 g of (M-2-8).

(2) Production of (S-2-4):

(M-2-8) (10 g, 27 mmols) and 3-(triethoxysilyl)propyl isocyanate (M-2-9) (6.7 g, 27 mmols) were dissolved in ethyl acetate, to which was added dibutyltin (IV) dilaurate (10 mg), and heated under reflux for 4 hours. The reaction mixture was concentrated and purified through silica gel column chromatography to obtain 6.4 g of a white solid (S-2-4).

Production Example 2-3

A precursor (S-2-23) was produced according to the following reaction scheme:

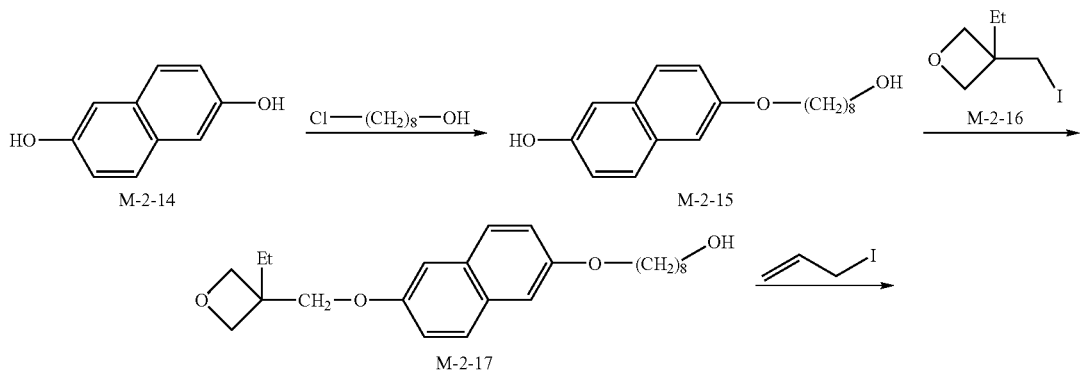

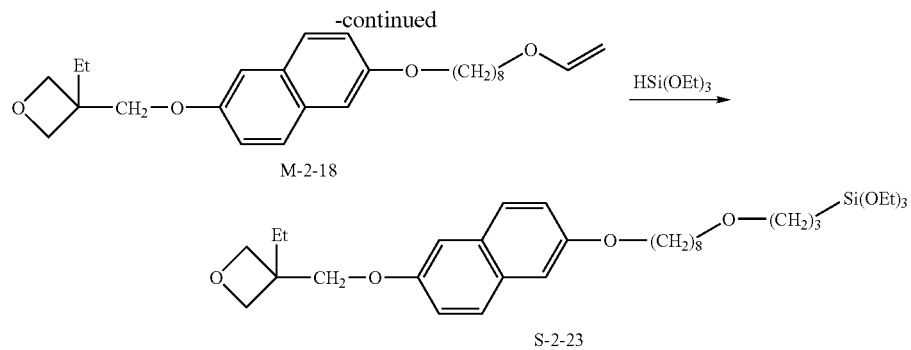

(1) Production of Intermediate (M-2-17):

4,4'-Dihydroxynaphthalene (M-14) (23.5 g, 143 mmols) was dissolved in 8 ml of dimethylacetamide, to which were added potassium carbonate (11.1 g, 80 mmols) and potassium iodide (6.7 g). Then, 8-chloro-octanol (71.8 g, 72 mmols) was added to it. The reaction liquid was stirred at 110° C. for 9 hours and then cooled to room temperature, and this was poured into water. The crystal precipitated was collected through filtration. The crude crystal was recrystallized from acetonitrile to obtain 16.3 g of (M-2-15). (M-2-15) (10 g, 34.7 mmols) was dissolved in 40 ml of dimethylacetamide, to which was added potassium carbonate (9.6 g). With stirring at 50° C., an iodide (M-2-16) (9.4 g, 41.6 mmols) was dropwise added to it. This was reacted at 100° C. for 4 hours, and the reaction mixture was poured into water. The resulting crude crystal was recrystallized from acetonitrile to obtain 4.2 g of (M-2-17).

(2) Production of Intermediate (M-2-18):

(M-2-17) (3.6 g, 9.4 mmols) was dissolved in dewatered tetrahydrofuran. With stirring under heat at 60° C., sodium hydride (60% in oil) (0.5 g, 12.2 mmols) was added to it little by little, and this became foamed. After its foaming was stopped, allyl iodide (2.4 g, 14.1 mmols) was dropwise added to it. The reaction mixture was stirred at 60° C. for 3 hours, then poured into water, extracted with ethyl acetate, and purified through column chromatography to obtain 2.1 g of (M-2-18).

(3) Production of (S-2-23):

(M-2-18) (1.5 g, 3.4 mmols) and triethoxysilane (2.4 g, 14.3 mmols) were dissolved in 10 ml of toluene, and a solution of 10 mg of chloroauric acid dissolved in 0.5 ml of benzonitrile was added to it in a nitrogen atmosphere at 80° C. The reaction liquid was reacted at 80° C. for 1 hour, then concentrated and purified through silica gel column chromatography to obtain 0.76 g of (S-2-23).

Production Example 2-4

A precursor (S-2-24) was produced according to the following reaction scheme:

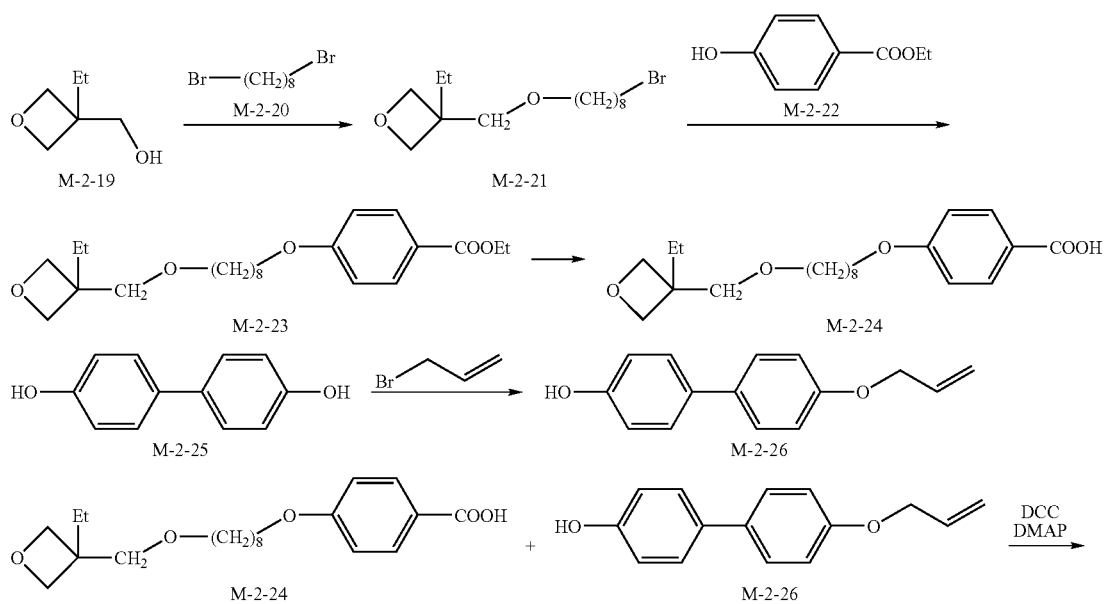

-continued

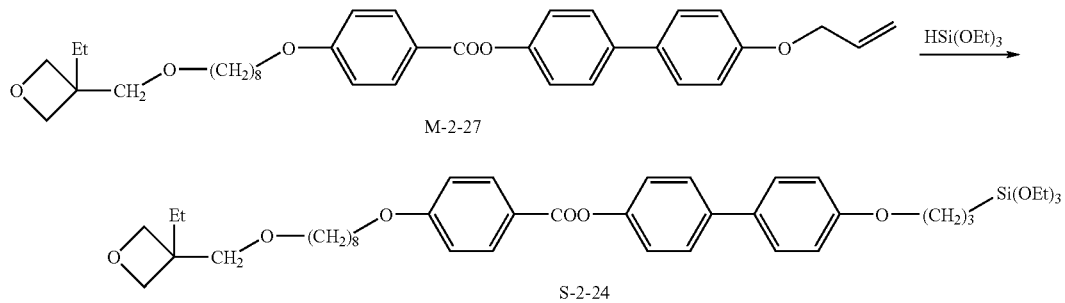

(1) Production of Intermediate (M-2-24):

Tetrabutylammonium bromide (3.0 g) was dissolved in aqueous 50% sodium hydroxide solution, to which were added 3-ethyl-3-oxetane-methanol (M-2-19) (19 g, 0.16 mols) and 1,8-dibromo-octane (M-2-20) (136 g, 0.5 mols). The reaction liquid was stirred under heat for reflux for 3.5 hours, and then cooled with ice. 600 ml of water was added to it, and this was extracted with ethyl acetate. The excess bromide (M-2-20) was removed through distillation under reduced pressure, and the residue was purified through column chromatography to obtain 36 g of (M-2-21). (M-2-21) (33 g, 0.107 mols) was dissolved in 120 ml of dimethylacetamide, to which were added ethyl 4-hydroxybenzoate (M-2-22) (17 g, 0.102 mols) and potassium carbonate (23 g). This was stirred at 80° C. for 8 hours, then poured into water, extracted with ethyl acetate, and purified through column chromatography to obtain 35 g of (M-2-23). (M-2-23) (35.4 g, 90.2 mmols) was dissolved in 60 ml of ethanol, to which were added sodium hydroxide (7.2 g, 180 mmols) and water (20 ml). With that, this was stirred at 60° C. for 3 hours. The reaction mixture was neutralized with concentrated hydrochloric acid (15.4 ml, 85.8 ml/mol) added thereto. Then, this was extracted with ethyl acetate and purified through column chromatography to obtain 33 g of (M-2-24).

(2) Production of Intermediate (M-2-26):

Dihydroxybiphenyl (M-2-25) (25 g, 134 mmols) was dissolved in 100 ml of acetone, to which was added potassium carbonate (20 g, 145 mmols). With stirring at 60° C., a solution of allyl bromide (16.2 g, 134 mmols) in 100 ml of acetone was dropwise added to it. Then, this was stirred at 60° C. for 7 hours, and the salt precipitated was removed through filtration. Water, diluted hydrochloric acid and sodium chloride were added to the resulting filtrate, and then extracted with ethyl acetate. This was concentrated and the resulting crude crystal was recrystallized from ethanol to obtain 6 g of (M-2-26).

(3) Production of Intermediate (M-2-27):

(M-2-24) (10.5 g, 31.2 mmols) was dissolved in 100 ml of chloroform, to which were added (M-2-26) (6.4 g, 28.4 mmols) and dimethylaminopyridine (5.2 g, 42.6 mmols). The reaction liquid was cooled to 0° C., and a solution of dicyclohexylcarbodiimide (5.8 g, 45.4 mmols) in 20 ml of chloroform was dropwise added to it, and stirred at 0° C. for 1 hour. The salt precipitated was filtered away, and the resulting filtrate was concentrated and purified through column chromatography to obtain 11.9 g of (M-2-27).

(4) Production of (S-2-24):

(M-2-27) (5.7 g, 10 mmols) and triethoxysilane (5.0 g, 30 mmols) were dissolved in 25 ml of toluene, and a solution of 17 mg of chloroauric acid in 0.5 ml of benzonitrile was dropwise added to it in a nitrogen atmosphere at 80° C. This was reacted at 80° C. for 1 hour, and the reaction mixture was concentrated and purified through silica gel column chromatography to obtain 3.2 g of (S-2-24).

Production Example 3-1

A precursor (S-3-1) was produced according to the following reaction scheme:

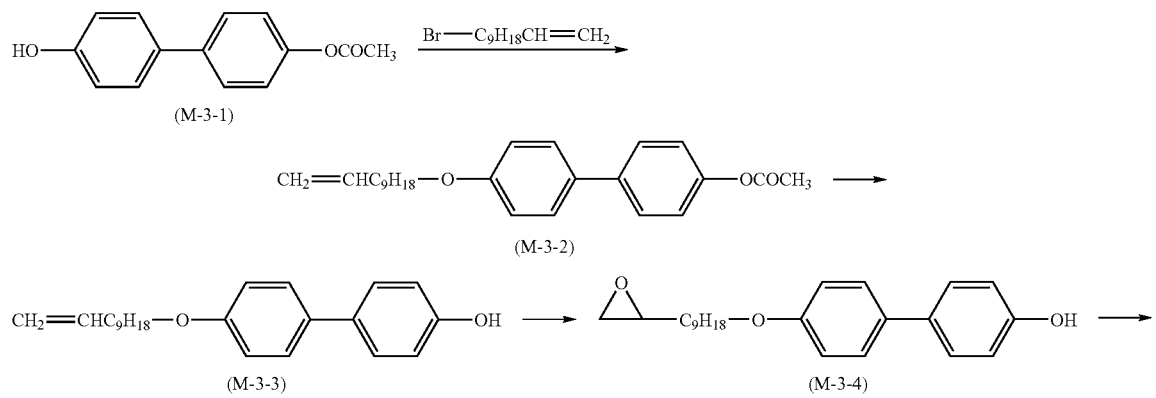

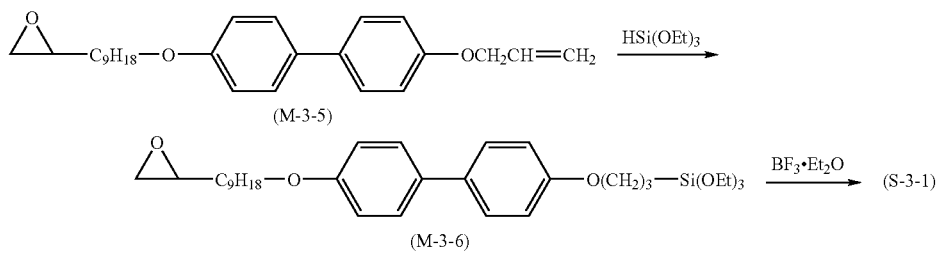

(1) Production of Intermediate (M-3-3):

4,4'-Dihydroxy-biphenylmonoacetylate (M-3-1) (45.6 g, 200 mmols) was dissolved in 1000 ml of DMF, to which was added 20 g of potassium carbonate. 11-Bromo-1-undecene (47.2 g, 200 mmols) was dropwise added to it. The reaction liquid was heated at 80° C. for 5 hours, then cooled to room temperature, and poured into water. The crystal precipitated was collected through filtration. The crude crystal was washed with hot methanol, and dried to obtain 72 g of (M-3-2).

(M-3-2) (50.8 g, 133.5 mmols) was dispersed in 100 ml of methanol, to which was added aqueous potassium hydroxide solution (KOH 12 g/water 10 ml), and heated at 40° C. for 1 hour and then at 80° C. for 20 minutes. Then, the reaction liquid was poured into water, and the crystal precipitated was taken out through filtration, washed with hot methanol and dried to obtain 44 g of (M-3-3).

(2) Production of Intermediate (M-3-5):

(M-3-3) (20.3 g, 60 mmols) was dissolved in 400 ml of methylene chloride, to which was added 120 ml of aqueous 0.5 M sodium hydrogencarbonate solution. With stirring it, m-chloroperbenzoic acid (purity 69%, 16.5 g, 66 mmols) was added to it over a period of 10 minutes. This was further stirred for 7 hours, and water and a small amount of sodium hydrogensulfite were added to the reaction liquid. Then, this was washed with water, and methylene chloride was evaporated away to obtain a crude crystal. The crude crystal was washed with hot acetonitrile to obtain 12 g of (M-3-4).

(M-3—4) (11 g, 31 mmols) was dissolved in 50 ml of dimethylformamide, to which was added 10 g of potassium carbonate. With stirring it, allyl iodide (5.2 g, 31 mmols) was dropwise added thereto. This was further stirred at room temperature for 2 hours, and then at 50° C. for 1 hour. The reaction liquid was poured into water, and the crystal precipitated was recrystallized from methanol to obtain 12.1 g of (M-3-5).

(3) Production of Intermediate (M-3-6):

(M-3-5) (5 g, 12.7 mmols) and triethoxysilane (3.13 g, 19.05 mmols) were dissolved in a mixed solvent of 50 ml of toluene and 5 ml of isopropanol, and then heated at 80° C. In a nitrogen atmosphere, 10 mg of chloroauric acid hexahydrate was added to it. This was reacted at 80 to 90° C. for 1 hour, and then the solvent was evaporated away. The residue was purified through silica gel column chromatography to obtain 3.2 g of (M-3-6).

(4) Production of (S-3-1):

(M-3-6) (5 g, 8.94 mmols) was dissolved in 20 ml of methylene chloride, to which was added boron trifluoride/diethyl ether complex (0.02 ml, $1.63 \times 10^{-2}$ mmols), and reacted in a nitrogen atmosphere at room temperature for 24 hours. The resulting reaction solution was poured into 400 ml of methanol, and the solid precipitated was taken out through filtration to obtain 3.8 g of a waxy solid (S-3-1)

Production Example 3-2

A precursor (S-3-7) was produced according to the following reaction scheme:

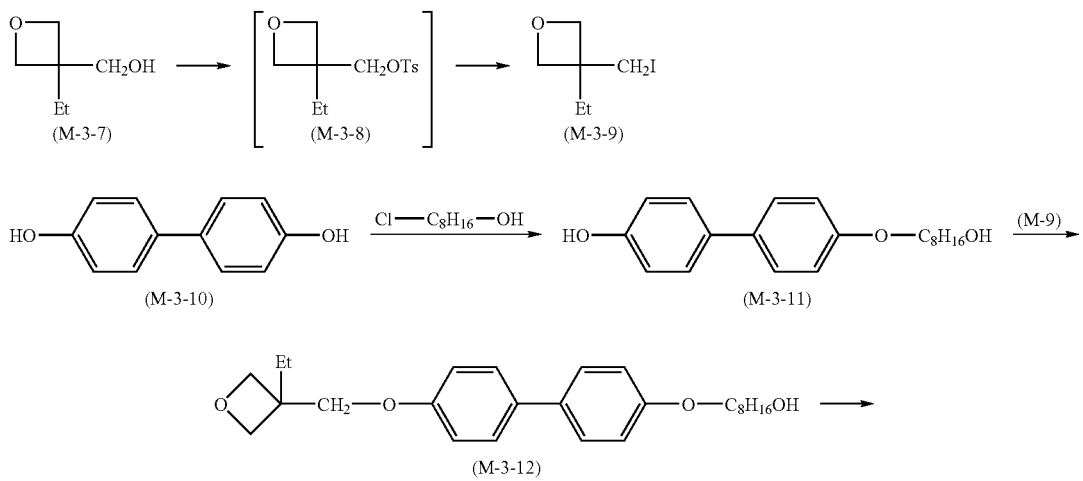

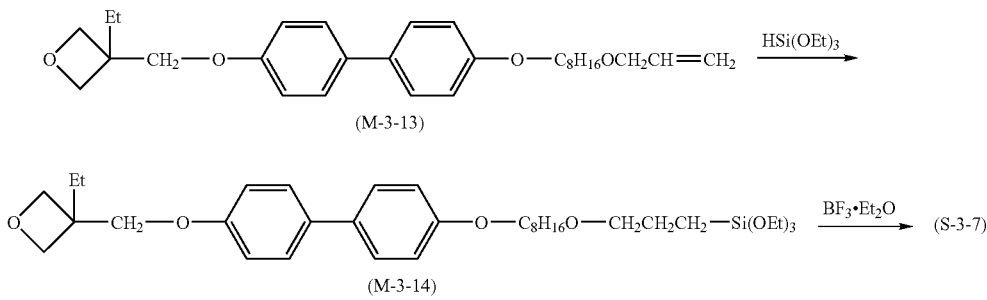

(1) Production of Intermediate (M-3-9):

3-Ethyl-3-hydroxymethyloxetane (50 g, 430 mmols) and 4-(N,N-dimethylamino) pyridine (2 g) were dissolved in a mixed solvent of 200 ml of tetrahydrofuran and 72 ml of triethylamine, to which was added p-toluenesulfonic acid (90.3 g, 473 mmols), and then heated under reflux for 24 hours. The reaction solution was extracted with ethyl acetate and then concentrated. The resulting residue was dissolved in 300 ml of acetonitrile, to which was added 100 g of sodium iodide and heated under reflux for 5 hours. The organic matter was extracted out from the reaction solution, and this was purified through silica gel column chromatography to obtain 38 g of a colorless oily iodide (M-3-9).

(2) Production of Intermediate (M-3-12):

(M-3-10) (76.2 g, 410 mmols) was dissolved in 400 ml of dimethylacetamide, to which were added 42.2 g of potassium carbonate and 24.1 g of potassium iodide. 8-Chloroctanol (47.2 g, 287 mmols) was added to it. The reaction solution was stirred at 110° C. for 5 hours, and then cooled to room temperature. Then, this was poured into water, and the crystal precipitated was taken out through filtration. The resulting crude crystal was recrystallized from acetonitrile to obtain 63.8 g of (M-3-11).

(M-3-11) (10 g. 31.8 mmols) was dissolved in 40 ml of dimethylacetamide, to which was added potassium carbonate (3.3 g). With stirring it at 50° C., (M-3-9) (8 g, 35.4 mmols) was dropwise added thereto. This was reacted at 85° C. for 5 hours, and the reaction mixture was poured into water. The resulting crude crystal was recrystallized twice from acetonitrile to obtain 10 g of (M-3-12).

(3) Production of Intermediate (M-3-14):

(M-3-12) (5.71 g, 13.8 mmols) was dissolved in dimethylsulfoxide (50 ml) heated at 60° C., to which was added sodium hydride (containing 30 to 40% oil, 0.83 g). Allyl bromide (2.5 g, 20.7 mmols) was dropwise added to the reaction solution, and reacted at 70° C. for 5 hours. The resulting reaction solution was poured into water, and the organic matter was extracted out of it with ethyl acetate. Thus extracted, the solution was concentrated and then washed with acetonitrile to obtain 4.1 g of a white solid (M-3-13).

(M-3-13) (4.0 g, 8.84 mmols) and triethoxysilane (1.74 g, 10.6 mmols) were dissolved in 20 ml of toluene and heated at 80° C. In a nitrogen atmosphere, chloroauric acid hexahydrate (10 mg) was added to it. The reaction solution was heated at 80 to 90° C. and reacted for 2 hours, and this was filtered through filter paper and then concentrated. Thus concentrated, the reaction mixture was purified through silica gel column chromatography to obtain 2.1 g of a colorless oil (M-3-14).

(4) Production of (S-3-7):

(M-3-14) (2 g, 3.24 mmols) was dissolved in 10 ml of methylene chloride, to which was added boron trifluoride/diethyl ether complex (0.01 ml, 8.13×10$^{-3}$ mmols). In a nitrogen atmosphere, this was reacted at room temperature for 24 hours. The reaction solution was poured into 200 ml of methanol, and the solid precipitated was taken out through filtration to obtain 1.3 g of a waxy solid (S-3-7).

Example 1-1

(1) Formation of Proton-Conductive Membrane (E-1-1):

Precursor (S-1-1) (500 mg) and tetraethoxysilane (TEOS, 185 mg) were dissolved in 5 ml of ethanol, to which was added 0.4 ml of aqueous 1% hydrochloric acid at 25° C. This was stirred at 25° C. for 20 minutes, and then an ethanol solution of phosphoric acid (phosphoric acid ($H_3PO_4$, 174 mg)/ethanol 3 ml) was dropwise added to it. Using an applicator, the reaction liquid was applied onto a Teflon sheet, statically left at room temperature for 2 hours, and heated at 50° C. for 2 hours and then heated at 120° C. for 3 hours. Next, this was peeled from the Teflon sheet to obtain a white solid sheet (E-1-1) having a thickness of 82 μm. Observed with a polarizing microscope, this showed a texture to have a smectic A phase within a temperature range of from 25 to 160° C.

(2) Formation of Proton-Conductive Membrane (E-1-2):

A white solid sheet (E-1-2) having a thickness of 88 μm was obtained in the same manner as in above (1), for which, however, 250 mg of silicon compound (X-6) was used in place of 185 mg of TEOS.

(3) Formation of Proton-Conductive Membrane (E-1-3):

A white solid sheet (E-1-3) having a thickness of 75 μm was obtained in the same manner as in above (1), for which, however, 250 mg of silicon compound (X-11) was used in place of 185 mg of TEOS.

(4) Formation of Proton-Conductive Membrane (E-1-4):

Precursor (S-1-4) (880 mg) was dissolved in isopropanol, to which was added 36 μl of aqueous 2% hydrochloric acid at 25° C., and stirred for 20 minutes. An isopropanol solution of phosphoric acid ($H_3PO_4$, 192 mg)/(isopropanol 1 ml) was added to it, and the reaction liquid became milky. 2 ml of toluene was added to it, and when the reaction liquid became transparent, this was applied onto a Teflon sheet with an applicator. This was statically left at room temperature for 2 hours, and heated at 50° C. for 2 hours and then at 80° C. for 3 hours. Next, this was peeled from the Teflon sheet to obtain a white solid sheet (E-1-4) having a thickness of 50 μm.

Observed with a polarizing microscope, this showed a texture to have a smectic A phase within a temperature range of from 25 to 130° C.

(5) Formation of Proton-Conductive Membrane (E-1-5):

Precursor (S-1-4) (700 mg) and silicon compound (X-6)) 176 mg) were dissolved in isopropanol, to which was added 36 µl of aqueous 2% hydrochloric acid at 25° C., and stirred for 20 minutes. An isopropanol solution of phosphoric acid (phosphoric acid ($H_3PO_4$, 192 mg)/isopropanol 1 ml) was added to it, and the reaction liquid became milky. 2 ml of toluene was added to it, and when the reaction liquid became transparent, this was applied onto a Teflon sheet with an applicator. This was statically left at room temperature for 2 hours, and heated at 50° C. for 2 hours and then at 80° C. for 3 hours. Next, this was peeled from the Teflon sheet to obtain a white solid sheet (E-1-5) having a thickness of 58 µm.

(6) Formation of Proton-Conductive Membrane (E-1-6):

A white solid sheet (E-1-6) having a thickness of 62 µm was obtained in the same manner as in above (5), for which, however, silicon compound (X-11) was used in place of silicon compound (X-6).

(7) Formation of Proton-Conductive Membrane (E-1-7):

(S-1-4) (680 mg) and (K-10) (200 mg) were dissolved in isopropanol, to which was added 36 µl of aqueous 2% hydrochloric acid at 25° C. This was stirred for 5 minutes, and then an isopropanol solution of phosphoric acid (phosphoric acid ($H_3PO_4$, 192 mg)/isopropanol 1 ml) and xylene (3 ml) were added to it. This was cast onto a polyimide film. After left at room temperature for 2 hours, this was heated at 50° C. for 2 hours and then at 80° C. for 3 hours. Next, this was peeled from the polyimide film to obtain a milky-white solid sheet (E-1-7) having a thickness of 100 µm. Observed with a polarizing microscope, this was found to have aggregates of anisotropic domains.

(8) Formation of Proton-Conductive Membrane (E-1-8):

A semi-transparent film (E-1-8) having a thickness of 110 µm was obtained in the same manner as in above (7), for which, however, (K-14) was used in place of (K-10). Observed with a polarizing microscope, this was found to have aggregates of anisotropic domains.

Example 1-2

(1) Formation of Proton-Conductive Membrane (E-2-1):

Precursor (S-2-1) (500 mg) was dissolved in 5 ml of ethanol, to which was added 0.4 ml of aqueous 1% hydrochloric acid at 25° C. This was stirred at 25° C. for 20 minutes, and then an ethanol solution of phosphoric acid (phosphoric acid ($H_3PO_4$, 85 mg)/ethanol 3 ml) was dropwise added to it. The reaction liquid was cast into a Teflon dish, then dried with blasting at room temperature for 2 hours, and heated at 50° C. for 2 hours and then at 120° C. for 3 hours. Next, this was peeled from the Teflon dish to obtain a white solid sheet (E-2-1) having a thickness of 111 µm. Observed with a polarizing microscope, this showed a texture to have a smectic A phase.

(2) Formation of Proton-Conductive Membrane (E-2-2):

Precursor (S-2-7) (500 mg) and tetraethoxysilane (TEOS, 185 mg) were dissolved in 5 ml of ethanol, to which was added 0.4 ml of aqueous 1% hydrochloric acid at 25° C. This was stirred at 25° C. for 20 minutes, and then an ethanol solution of phosphoric acid (phosphoric acid ($H_3PO_4$, 174 mg)/ethanol 3 ml) was dropwise added to it. The reaction liquid was cast into a Teflon dish, then statically left at room temperature for 2 hours, and heated at 50° C. for 2 hours and then at 120° C. for 6 hours. Next, this was peeled from the Teflon dish to obtain a white solid sheet (E-2-2) having a thickness of 124 µm.

(3) Formation of Proton-Conductive Membrane (E-2-3):

A white solid sheet (E-2-3) having a thickness of 124 µm was obtained in the same manner as in above (2), for which, however, 250 mg of (X-11) was used in place of 185 mg of TEOS. Observed with a polarizing microscope, this showed a texture to have a smectic A phase.

(4) Formation of Proton-Conductive Membrane (E-2-4):

A white solid sheet (E-2-4) having a thickness of 108 µm was obtained in the same manner as in above (1), for which, however, 500 mg of (S-2-4) was used in place of 500 mg of (S-2-1). Observed with a polarizing microscope, this showed a texture to have a smectic A phase.

(5) Formation of Proton-Conductive Membrane (E-2-5):

A white solid sheet (E-2-5) having a thickness of 126 µm was obtained in the same manner as in above (2), for which, however, 500 mg of (S-2-4) was used in place of 500 mg of (S-2-7). Observed with a polarizing microscope, this showed a texture to have a smectic A phase.

(6) Formation of Proton-Conductive Membrane (E-2-6):

A white solid sheet (E-2-6) having a thickness of 133 µm was obtained in the same manner as in above (3), for which, however, 500 mg of (S-2-4) was used in place of 500 mg of (S-2-7).

(7) Formation of Proton-Conductive Membrane (E-2-7):

(S-2-7) (880 mg) was dissolved in isopropanol, to which was added 36 µl of aqueous 2% hydrochloric acid at 25° C. This was stirred for 5 minutes, and then an isopropanol solution of phosphoric acid (phosphoric acid ($H_3PO_4$, 192 mg)/isopropanol 1 ml) and xylene (3 ml) were added to it. This was cast onto a polyimide film. After left at room temperature for 8 hours, this was heated at 50° C. for 2 hours. Next, this was peeled from the polyimide film to obtain a milky-white solid sheet (E-2-7) having a thickness of 110 µm. Observed with a polarizing microscope, this was found to have aggregates of anisotropic domains.

(8) Formation of Proton-Conductive Membrane (E-2-8):

(S-2-7) (680 mg) and (K-10) (200 mg) were dissolved in isopropanol, to which was added 36 µl of aqueous 2% hydrochloric acid at 25° C. This was stirred for 5 minutes, and then an isopropanol solution of phosphoric acid (phosphoric acid ($H_3PO_4$, 192 mg)/isopropanol 1 ml) and xylene (3 ml) were added to it. This was cast onto a polyimide film. After left at room temperature for 8 hours, this was heated at 50° C. for 2 hours. Next, this was peeled from the polyimide film to obtain a semi-transparent solid sheet (E-2-8) having a thickness of 115 µm. Observed with a polarizing microscope, this was found to have aggregates of anisotropic domains.

(9) Formation of Proton-Conductive Membrane (E-2-9):

A milky-white solid sheet (E-2-9) having a thickness of 105 µm was obtained in the same manner as in above (7), for which, however, (S-2-23) was used in place of (S-2-7). Observed with a polarizing microscope, this was found to have aggregates of anisotropic domains.

(10) Formation of Proton-Conductive Membrane (E-2-10):

A milky-white solid sheet (E-2-10) having a thickness of 105 µm was obtained in the same manner as in above (8), for which, however, (S-2-23) was used in place of (S-2-7). Observed with a polarizing microscope, this was found to have aggregates of anisotropic domains.

Example 1-3

(1) Formation of Proton-Conductive Membrane (E-3-1):

Precursor (S-3-1) (500 mg) was dissolved in a mixed solvent of 5 ml of isopropanol- and 5 ml of toluene, to which was added 0.5 ml of aqueous 1% hydrochloric acid at 25° C. This was stirred at 25° C. for 20 minutes, and then an ethanol solution of phosphoric acid (phosphoric acid ($H_3PO_4$, 85 mg)/ethanol 3 ml) was dropwise added to it. The reaction liquid was cast into a Teflon dish, then dried with blasting at room temperature for 2 hours, and heated at 50° C. for 2 hours and then at 120° C. for 5 hours. Next, this was peeled from the Teflon dish to obtain a white solid sheet (E-3-1) having a thickness of 50 μm.

(2) Formation of Proton-Conductive Membrane (E-3-2):

Precursor (S-3-1) (500 mg) and tetraethoxysilane (TEOS, 185 mg) were dissolved in a mixed solvent of 5 ml of isopropanol and 5 ml of toluene, to which was added 0.5 ml of aqueous 1% hydrochloric acid at 25° C. This was stirred at 25° C. for 20 minutes, and then an ethanol solution of phosphoric acid (phosphoric acid ($H_3PO_4$, 174 mg)/ethanol 3 ml) was dropwise added to it. The reaction liquid was cast into a Teflon dish, then statically left at room temperature for 2 hours, and heated at 50° C. for 2 hours and then at 120° C. for 6 hours. Next, this was peeled from the Teflon dish to obtain a white solid sheet (E-3-2) having a thickness of 78 μm. Observed with a polarizing microscope, this showed a texture to have a smectic A phase.

(3) Formation of proton-conductive membrane (E-3-3):

A white solid sheet (E-3-3) having a thickness of 98 μm was obtained in the same manner as in above (2), for which, however silicon compound (X-11) (250 mg) was used in place of TEOS (185 mg).

(4) Formation of Proton-Conductive Membrane (E-3-4):

A white solid sheet (E-3-4) having a thickness of 92 was obtained in the same manner as in above (1), for which, however, (S-3-7) (500 mg) was used in place of (S-3-1) (500 mg).

(5) Formation of Proton-Conductive Membrane (E-3-5):

A white solid sheet (E-3-5) having a thickness of 98 μm was obtained in the same manner as in above (2), for which, however, (S-3-7) (500 mg) was used in place of (S-3-1) (500 mg).

(6) Formation of Proton-Conductive Membrane (E-3-6):

A white solid sheet (E-3-6) having a thickness of 101 μm was obtained in the same manner as in above (3), for which, however, (S-3-7) (500 mg) was used in place of (S-3-1) (500 mg). Observed with a polarizing microscope, this showed a texture to have a smectic A phase.

(7) Formation of Proton-Conductive Membrane (E-3-7):

(S-3-1) (500 mg) and K-10 (50 mg) were dissolved in a mixed solvent of 5 ml of isopropanol and 5 ml of toluene, to which was added 0.5 ml of aqueous 1% hydrochloric acid at 25° C. This was stirred at 25° C. for 20 minutes, and then an ethanol solution of phosphoric acid (phosphoric acid ($H_3PO_4$, 85 mg)/ethanol 3 ml) was dropwise added to it. The reaction liquid was cast into a Teflon dish, then dried with blasting at room temperature for 2 hours, and heated at 50° C. for 2 hours and then at 120° C. for 5 hours. Next, this was peeled from the Teflon dish to obtain a milky-white solid sheet (E-3-7) having a thickness of 70 μm. Observed with a polarizing microscope, this was found to have aggregates of anisotropic domains.

(8) Formation of Proton-Conductive Membrane (E-3-8):

A semi-transparent film (E-3-8) having a thickness of 65 μm was obtained in the same manner as in above (7), for which, however, (K-14) was used in place of (K-10). Observed with a polarizing microscope, this was found to have aggregates of anisotropic domains.

Comparative Example 1

(1) Formation of Proton-Conductive Membrane (R-1-1):

1 g of precursor, silicon compound (X-6) was dissolved in ethanol, to which was added 50 μl of aqueous 2% hydrochloric acid at 25° C., and stirred for 20 minutes. An isopropanol solution of phosphoric acid (phosphoric acid ($H_3PO_4$, 500 mg)/isopropanol 1 ml) was added to the solution. This was stirred at 25° C. for 30 minutes, and applied onto a Teflon sheet with an applicator. This was statically left at room temperature for 2 hours, and heated at 50° C. for 2 hours and then at 80° C. for 3 hours. Next, this was peeled from the Teflon sheet to obtain a transparent solid sheet (R-1-1) having a thickness of 95 μm.

(2) Formation of Proton-Conductive Membrane (R-1-2):

A transparent solid sheet (R-1-2) having a thickness of 92 μm was obtained in the same manner as in above (1), for which, however, 800 mg of a precursor, silicon compound (X-6) and 200 mg of TEOS were used.

(3) Formation of Proton-Conductive Membrane (R-1-3):

A transparent solid sheet (R-1-3) having a thickness of 95 μm was obtained in the same manner as in above (1), for which, however, 800 mg of a precursor, silicon compound (X-11) and 200 mg of TEOS were used.

Comparative Example 2

(1) Formation of Proton-Conductive Membrane (R-2-1):

800 mg of precursor (X-11) and 200 mg of TEOS were dissolved in ethanol, to which was added 50 μl of aqueous 2% hydrochloric acid at 25° C., and stirred for 20 minutes. An isopropanol solution of phosphoric acid (phosphoric acid ($H_3PO_4$, 500 mg)/isopropanol 1 ml) was added to it and stirred at 25° C. for 30 minutes. Using an applicator, this was applied onto a Teflon sheet, then statically left at room temperature for 2 hours, and heated at 50° C. for 2 hours and then at 80° C. for 3 hours. Next, this was peeled from the Teflon sheet to obtain a transparent solid sheet (R-2-1) having a thickness of 85 μm.

Comparative Example 3

(1) Formation of Proton-Conductive Membrane (R-3-1):

Precursor, silicon compound (X-11) (800 mg) and TEOS (200 mg) were dissolved in ethanol, to which was added 50 μl of aqueous 2% hydrochloric acid at 25° C., and stirred for 20 minutes. An isopropanol solution of phosphoric acid (phosphoric acid ($H_3PO_4$, 500 mg)/isopropanol 1 ml) was added to it and stirred at 25° C. for 30 minutes. Using an applicator, this was applied onto a Teflon sheet, then statically left as such for 2 hours, and heated at 50° C. for 2 hours and then at 80° C. for 3 hours. Next, this was peeled from the Teflon sheet to obtain a transparent solid sheet (R-3-1) having a thickness of 85 μm.

Example 2-1

Circular discs having a diameter of 13 mm were blanked out of the proton-conductive membranes (E-1-1) to (E-1-8) of the invention produced in Example 1-1, the comparative membranes (R-1-1) to (R-1-3) produced in Comparative Example 1, and Nafion 117 (by DuPont). Sandwiched between two stainless plates, the ionic conductivity of each of these samples was measured at 25° C. and at a relative humidity of 60% according to an AC impedance process. The results are given in Table 1-1.

TABLE 1-1

| Proton-Conductive Membrane | Precursor | Ionic Conductivity $\times 10^{-3}$ S/cm | Remarks |
| --- | --- | --- | --- |
| (E-1-1) | (S-1-1)/TEOS | 0.83 | the invention |
| (E-1-2) | (S-1-1)/(X-6) | 0.91 | the invention |
| (E-1-3) | (S-1-1)/(X-11) | 1.10 | the invention |
| (E-1-4) | (S-1-4) | 0.78 | the invention |
| (E-1-5) | (S-1-4)/(X-6) | 0.81 | the invention |
| (E-1-6) | (S-1-4)/(X-11) | 0.93 | the invention |
| (E-1-7) | (S-1-4)/(K-10) | 1.21 | the invention |
| (E-1-8) | (S-1-4)/(K-14) | 2.01 | the invention |
| (R-1-1) | (X-6) | 0.072 | comparison |
| (R-1-2) | (X-6)/TEOS | 0.061 | comparison |
| (R-1-3) | (X-11)/TEOS | 0.074 | comparison |
| Nafion 117 | — | 6.20 | comparison |

Though not comparable to Nafion 117, the proton-conductive membranes of the invention were found to have a higher ionic conductivity than the comparative, non-oriented hybrid membranes (R-1-1) to (R-1-3). Membranes (E-1-7) and (E-1-8) containing K-10 and K-14, which impart plasticity into the membranes, showed a higher ionic conductivity.

Example 2-2

In the same manner as in Example 1-2, the ionic conductivity of the proton conductors of the invention (E-2-1) to (E-2-10) produced in Example 2-1, the comparative membrane (R-2-1) produced in Comparative Example 2 and Nafion 117 (by DuPont) was measured. The results are given in Table 1-2.

TABLE 1-2

| Proton-Conductive Membrane | Precursor | Ionic Conductivity $\times 10^{-3}$ S/cm | Remarks |
| --- | --- | --- | --- |
| (E-2-1) | (S-1-1) | 0.94 | the invention |
| (E-2-2) | (S-1-1)/TEOS | 0.98 | the invention |
| (E-2-3) | (S-1-1)/(X-11) | 1.05 | the invention |
| (E-2-4) | (S-1-4) | 0.93 | the invention |
| (E-2-5) | (S-1-4)/TEOS | 0.95 | the invention |
| (E-2-6) | (S-1-4)/(X-11) | 1.01 | the invention |
| (E-2-7) | (S-2-7) | 1.54 | the invention |
| (E-2-8) | (S-2-7)/(K-10) | 2.31 | the invention |
| (E-2-9) | (S-2-23) | 1.81 | comparison |
| (E-2-10) | (S-2-23)/(K-14) | 2.51 | comparison |
| (R-2-1) | (X-11)/TEOS | 0.074 | comparison |
| Nafion 117 | — | 6.20 | comparison |

Though not comparable to Nafion 117, the proton-conductive membranes of the invention were found to have a higher ionic conductivity than the non-liquid-crystalline hybrid membrane (R-2-1) of Comparative Example 2-1. Membranes (E-2-8) and (E-2-10) containing K-10 and K-14, which impart plasticity into the membranes, showed a higher ionic conductivity.

Example 2-3

Discs having a diameter of 13 mm were formed out of the proton conductors (E-3-1) to (E-3-8) of the invention produced in Example 1-3, the comparative membrane (R-3-1) produced in Comparative Example 3, and Nafion 117 (by DuPont). Sandwiched between two stainless plates, the ionic conductivity of each of these samples was measured at 25° C. and at a relative humidity of 60% according to an AC impedance process. The results are given in Table 1-3.

TABLE 1-3

| Proton-Conductive Membrane | Precursor | Ionic Conductivity $\times 10^{-3}$ S/cm | Remarks |
| --- | --- | --- | --- |
| (E-3-1) | (S-3-1) | 0.88 | the invention |
| (E-3-2) | (S-3-1)/TEOS | 0.92 | the invention |
| (E-3-3) | (S-3-1)/(X-11) | 1.01 | the invention |
| (E-3-4) | (S-3-7) | 1.11 | the invention |
| (E-3-5) | (S-3-7)/TEOS | 0.98 | the invention |
| (E-3-6) | (S-3-7)/(X-11) | 1.20 | the invention |
| (E-3-7) | (S-3-1)/(K-10) | 2.10 | the invention |
| (E-3-8) | (S-3-1)/(K-14) | 2.30 | the invention |
| (R-3-1) | (X-11)/TEOS | 0.074 | comparison |
| Nafion 117 | — | 6.20 | comparison |

Though not comparable to Nafion 117, the proton-conductive membranes of the invention were found to have a higher ionic conductivity than the comparative, non-liquid-crystalline hybrid membrane (R-3-1). Membranes (E-3-7) and (E-3-8) containing K-10 and K-14, which impart plasticity into the membranes, showed a higher ionic conductivity.

Example 3-1

(1) Formation of Catalyst Membrane:

2 g of platinum-carrying carbon (Vulcan XC72 with 50 mas.% platinum) was mixed with 15 g of a Nafion solution (5% alcoholic aqueous solution), and dispersed for 30 minutes with an ultrasonic disperser. The mean particle size of the resulting dispersion was about 500 nm. The dispersion was applied onto carbon paper (having a thickness of 350 μm) and dried, and a circular disc having a diameter of 9 mm was blanked out of it.

(2) Fabrication of MEA:

The catalyst membrane prepared in (1) was attached to both surfaces of the proton-conductive membrane produced in Example 1-1 and Comparative Example 1-1 in such a manner that the dispersion-coated face of the catalyst membrane could be contacted with the proton-conductive membrane, and hot-pressed at 120° C. and under 50 kg/cm² to fabricate MEA.

(3) Fuel Cell Properties:

The MEA fabricated in (2) was set in a fuel cell as in FIG. 2, and an aqueous 10 mas. % methanol solution was injected to the cell via the cathode-side opening 15. In this condition, the anode-side opening 16 was kept in contact with air. Using a galvanostat, a constant current of 5 mA/cm² was applied between the cathode 12 and the anode 13, and the cell voltage was measured in this stage. The results are given in Table 2-1.

TABLE 2-1

| Proton-Conductive Membrane | MEA | Cell C | Time-Dependent Change of Terminal Voltage (V) | | | Remarks |
| --- | --- | --- | --- | --- | --- | --- |
| | | | initial | after 0.5 hrs | after 1 hr | |
| (E-1-1) | 1-1 | 1-1 | 0.58 | 0.57 | 0.56 | the invention |
| (E-1-2) | 1-2 | 1-2 | 0.59 | 0.57 | 0.57 | the invention |
| (E-1-3) | 1-3 | 1-3 | 0.60 | 0.60 | 0.58 | the invention |

TABLE 2-1-continued

| Proton-Conductive Membrane | MEA | Cell C | Time-Dependent Change of Terminal Voltage (V) | | | Remarks |
| --- | --- | --- | --- | --- | --- | --- |
| | | | initial | after 0.5 hrs | after 1 hr | |
| (E-1-4) | 1-4 | 1-4 | 0.56 | 0.54 | 0.53 | the invention |
| (E-1-5) | 1-5 | 1-5 | 0.58 | 0.55 | 0.54 | the invention |
| (E-1-6) | 1-6 | 1-6 | 0.57 | 0.56 | 0.55 | the invention |
| (E-1-7) | 1-7 | 1-7 | 0.55 | 0.53 | 0.51 | the invention |
| (E-1-8) | 1-8 | 1-8 | 0.56 | 0.54 | 0.50 | the invention |
| (R-1-1) | 1-9 | 1-9 | 0.44 | 0.42 | 0.41 | comparison |
| (R-1-2) | 1-10 | 1-10 | 0.42 | 0.40 | 0.41 | comparison |
| (R-1-3) | 1-11 | 1-11 | 0.48 | 0.47 | 0.45 | comparison |
| Nafion 117 | 1-12 | 1-12 | 0.61 | 0.44 | 0.42 | comparison |

The initial voltage of the cell C-1-12 having MEA-1-12 with a Nafion membrane therein was high, but the voltage of the cell decreased in time. The time-dependent voltage depression in the cell is caused by the methanol-crossover phenomenon known in the art, or that is, by the leakage of the fuel methanol applied to the side of the cathode through the Nafion membrane toward the side of the anode. Contrary to this, the voltage in the cells C-1-1 to C-1-11 having MEA-1-1 to MEA-1-11, respectively, with the organic-inorganic hybrid membrane therein was stable. In particular, it is understood that the cells C-1-1 to C-1-8 of the invention that comprise MEA-1-1 to MEA-1-8, respectively, can maintain high voltage.

Example 3-2

In the same manner as in Example 3-1, the cell voltage in different cells was measured, for which, however, the proton-conductive membranes (E-2-1), (E-2-3), (E-2-6), (E-2-7), (E-2-8), (E-2-9), (E-2-10) and (R-2-1) produced in Example 2-1 and Comparative Example 2 were used. The results are given in Table 2-2.

TABLE 2-2

| Proton-Conductive Membrane | MEA | Cell C | Time-Dependent Change of Terminal Voltage (V) | | | Remarks |
| --- | --- | --- | --- | --- | --- | --- |
| | | | initial | after 0.5 hrs | after 1 hr | |
| (E-2-1) | 2-1 | 2-1 | 0.62 | 0.58 | 0.56 | the invention |
| (E-2-3) | 2-2 | 2-2 | 0.60 | 0.60 | 0.57 | the invention |
| (E-2-6) | 2-3 | 2-3 | 0.61 | 0.59 | 0.59 | the invention |
| (E-2-7) | 2-4 | 2-4 | 0.63 | 0.61 | 0.61 | the invention |
| (E-2-8) | 2-5 | 2-5 | 0.65 | 0.63 | 0.62 | the invention |
| (E-2-9) | 2-6 | 2-6 | 0.62 | 0.60 | 0.61 | comparison |
| (E-2-10) | 2-7 | 2-7 | 0.63 | 0.61 | 0.61 | comparison |
| (R-2-1) | 2-8 | 2-8 | 0.48 | 0.47 | 0.45 | comparison |
| Nafion 117 | 2-9 | 2-9 | 0.61 | 0.44 | 0.42 | comparison |

The initial voltage of the cell C-2-9 having MEA-2-9 with a Nafion membrane therein was high, but the voltage of the cell decreased in time. The time-dependent voltage depression in the cell is caused by the methanol-crossover phenomenon known in the art, or that is, by the leakage of the fuel methanol applied to the side of the cathode through the Nafion membrane toward the side of the anode. Contrary to this, the voltage in the cells C-2-1 to C-2-8 having MEA-2-1 to MEA-2-8, respectively, with the organic-inorganic hybrid membrane therein was stable. In particular, it is understood that the cells C-2-1 to C-2-7 of the invention that comprise MEA-2-1 to MEA-2-7, respectively, can maintain high voltage.

Example 3-3

In the same manner as in Example 3-1, the cell voltage in different cells was measured, for which, however, the proton-conductive membranes ((E-3-3), (E-3-4), (E-3-6) and (R-3-1)) produced in Example 3-1 and Comparative Example 3 were used. The results are given in Table 2-3.

TABLE 2-3

| Proton-Conductive Membrane | MEA | Cell | Time-Dependent Change of Terminal Voltage (V) | | | Remarks |
| --- | --- | --- | --- | --- | --- | --- |
| | | | initial | after 0.5 hrs | after 1 hr | |
| (E-3-3) | 3-1 | 3-1 | 0.59 | 0.60 | 0.60 | the invention |
| (E-3-4) | 3-2 | 3-2 | 0.62 | 0.59 | 0.58 | the invention |
| (E-3-6) | 3-3 | 3-3 | 0.60 | 0.57 | 0.58 | the invention |
| (E-3-7) | 3-4 | 3-4 | 0.63 | 0.63 | 0.61 | the invention |
| (E-3-8) | 3-5 | 3-5 | 0.63 | 0.61 | 0.60 | the invention |
| (R-3-1) | 3-6 | 3-6 | 0.48 | 0.47 | 0.45 | comparison |
| Nafion 117 | 3-7 | 3-7 | 0.61 | 0.44 | 0.42 | comparison |

The initial voltage of the cell C-3-7 having MEA-3-7 with a Nafion membrane therein was high, but the voltage of the cell decreased in time. The time-dependent voltage depression in the cell is caused by the methanol-crossover phenomenon known in the art, or that is, by the leakage of the fuel methanol applied to the side of the cathode through the Nafion membrane toward the side of the anode. Contrary to this, the voltage in the cells C-3-1 to C-3-6 having MEA-3-1 to MEA-3-6, respectively, with the organic-inorganic hybrid membrane therein was stable. In particular, it is understood that the cells C-3-1 to C-3-5 of the invention that comprise MEA-3-1 to MEA-3-5, respectively, can maintain high voltage.

Example 4-1

The proton-conductive membranes of the invention (E-1-1) to (E-1-8) and the comparative samples (R-1-1) to (R-1-3) used in Example 2-1 were kept dipped in an aqueous 50 mas.% methanol solution for 18 hours, and checked for the change of their shape. The proton-conductive membranes of the invention (E-1-1) to (E-1-6) and the comparative samples (R-1-1) to (R-1-3) all cracked, but the membranes of the invention (E-1-7) and (E-1-8) with (K-10) and (K-14) added thereto kept their original shape. This confirms that the addition of the compounds (K-10) and (K-14) improves the methanol resistance of the membranes.

Example 4-2

The proton-conductive membranes of the invention (E-2-1) to (E-2-10) and the comparative sample (R-2-1) used in Example 2-2 were kept dipped in an aqueous 50 mas. % methanol solution for 18 hours, and checked for the change of their shape. The proton-conductive membranes of the invention (E-2-1) to (E-2-7) and (E-2-9) and the comparative sample (R-2-1) all cracked, but the membranes of the invention (E-2-8) and (E-2-10) with (K-10) and (K-14) added thereto kept their original shape. This confirms that the addition of the compounds (K-10) and (K-14) improves the methanol resistance of the membranes.

Example 4-3

The proton-conductive membranes of the invention (E-3-1) to (E-3-10) and the comparative sample (R-3-1) used in Example 2-3 were kept dipped in an aqueous 50 mas. % methanol solution for 18 hours, and checked for the change of their shape. The proton-conductive membranes of the invention (E-3-1) to (E-3-6) and the comparative sample (R-3-1) all cracked, but the membranes of the invention (E-3-7) and (E-3-8) with (K-10) and (K-14) added thereto kept their original shape. This confirms that the addition of the compounds (K-10) and (K-14) improves the methanol resistance of the membranes.

As in the above, the organic-inorganic hybrid proton-conductive material of the invention, which is formed through sol-gel reaction of a precursor, mesogen group-having organosilicon compound has a high ionic conductivity at room temperature and reduces methanol crossover. Accordingly, when the material is used in direct methanol fuel cells, it enables higher output power from the cells than conventional proton-conductive membranes.

The present disclosure relates to the subject matter contained in Japanese Patent Application No. 281356/2002 filed on Sep. 26, 2002, Japanese Patent Application No. 281357/2002 filed on Sep. 26, 2002, and Japanese Patent Application No. 286894/2002 filed on Sep. 30, 2002 which are expressly incorporated herein by reference in its entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. An organic-inorganic hybrid proton-conductive material containing an organic-inorganic hybrid material and a proton source which imparts proton conductivity into the organic-inorganic hybrid material, and wherein the organic-inorganic hybrid material is produced by crosslinking a precursor that is an organosilicon compound having a mesogen group.

2. The organic-inorganic hybrid proton-conductive material of claim 1, wherein the organic-inorganic hybrid material is produced by three-dimensionally crosslinking the precursor.

3. The organic-inorganic hybrid proton-conductive material of claim 1, wherein the proton source is at least one selected from the group consisting of phosphorus compounds, organic sulfonic acids and perfluorocarbonsulfonic acid polymers.

4. The organic-inorganic hybrid proton-conductive material of claim 1, wherein the organic-inorganic hybrid material further comprises at least one compound of formula (1-4) or a polymer having a repeating unit of the formula (1-5), and wherein the amount of the at least one compound or polymer is in the range of from 1 mol % to 50 mol % relative to the precursor:

$$(Y^{14})_{n14}\text{-}A^{14}\text{-}(Z^{14})_{n13} \tag{1-4}$$

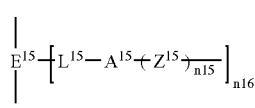
(1-5)

wherein, in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond though polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

5. The organic-inorganic hybrid proton-conductive material of claim 1, the organic-inorganic hybrid material is produced by polymerizing a compound of the following formula (1-1):

$$A^1\text{-}[Si(X^1)_{3\text{-}m11}(R^{11})_{m11}]_{n11} \tag{1-1}$$

wherein $A^1$ represents an organic atomic group that contains a mesogen group and an alkylene group having at least 4 carbon atoms; $R^{11}$ represents an alkyl group, an aryl group or a heterocyclic group; $X^1$ represents a halogen atom or $OR^{14}$; $R^{14}$ represents a hydrogen atom, an alkyl group, an aryl group or a silyl group; m11 indicates an integer of from 0 to 2; nil indicates an integer of from 1 to 10; when m11 or 3-m11 is 2 or more, then $R^{11}$'s or $X^1$'s may be the same or different.

6. The organic-inorganic hybrid proton-conductive material of claim 5, wherein the proton source is at least one selected from the group consisting of phosphorus compounds, organic sulfonic acids and perfluorocarbonsulfonic acid polymers.

7. The organic-inorganic hybrid proton-conductive material of claim 5, wherein the organic-inorganic hybrid material further comprises at least one compound of formula (1-4) or a polymer having a repeating unit of the formula (1-5), and wherein the amount of the at least one compound or polymer is in the range of from 1 mol % to 50 mol % relative to the precursor:

$$(Y^{14})_{n14}\text{-}A^{14}\text{-}(Z^{14})_{n13} \tag{1-4}$$

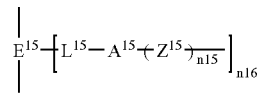
(1-5)

wherein, in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

8. The organic-inorganic hybrid proton-conductive material of claim 1, wherein the organic-inorganic hybrid material is produced by three-dimensionally crosslinking a precursor that is an organosilicon compound that has an alkoxysilyl group, a mesogen group and a substituent group capable of forming a carbon-carbon bond or a carbon-oxygen bond through polymerization.

9. The organic-inorganic hybrid proton-conductive material of claim 8, wherein the organic-inorganic hybrid material is produced through sol-gel reaction of a precursor that is an organosilicon compound of the following formula (2-1) to form an Si—O—Si bond, combined with polymerization of the substituent in the organosilicon compound to form a carbon-carbon bond or a carbon-oxygen bond:

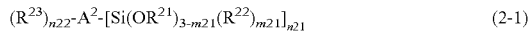  (2-1)

wherein $A^2$ represents an organic atomic group containing a mesogen group; $R^{21}$ represents an alkyl group; $R^{22}$ represents an alkyl group, an aryl group or a heterocyclic group; $R^{23}$ represents a substituent group capable of forming a carbon-carbon bond or a carbon-oxygen bond through polymerization; m21 indicates an integer of from 0 to 2; n21 indicates an integer of from 1 to 10; n22 indicates an integer of from 1 to 5; when 3-m21 or m21 is 2 or more, then $R^{21}$'s or $R^{22}$'s may be the same or different; when n22 is 2 or more, then $R^{23}$'s may be the same or different.

10. The organic-inorganic hybrid proton-conductive material of claim 9, wherein the proton source is at least one selected from the group consisting of phosphorus compounds, organic sulfonic acids and perfluorocarbonsulfonic acid polymers.

11. The organic-inorganic hybrid proton-conductive material of claim 9, wherein the organic-inorganic hybrid material further comprises at least one compound of formula (1-4) or a polymer having a repeating unit of the formula (1-5), and wherein the amount of the at least one compound or polymer is in the range of from 1 mol % to 50 mol % relative to the precursor:

  (1-4)

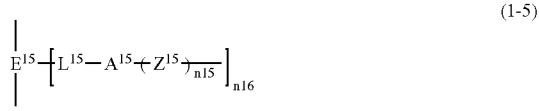  (1-5)

wherein, in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

12. The organic-inorganic hybrid proton-conductive material of claim 1, wherein the organic-inorganic hybrid material is produced through crosslinking polymerization of a precursor that is produced through crosslinking polymerization of a precursor that is a polymer having, in the side branches thereof, an atomic group that contains an alkoxysilyl group, a mesogen group and an alkylene group.

13. The organic-inorganic hybrid proton-conductive material of claim 12, wherein the organic-inorganic hybrid material is produced by a precursor is a polymer having a repeating unit of the following formula (3-1):

  (3-1)
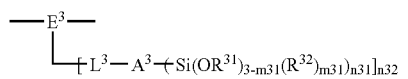

wherein $A^3$ represents an organic atomic group that contains a mesogen group and an alkylene group; $R^{31}$ represents an alkyl group; $R^{32}$ represents an alkyl group, an aryl group or a heterocyclic group; $E^3$ represents an alkyleneoxy group, an alkylene group or a siloxy group; $L^3$ represents a linking group; m31 indicates an integer of from 0 to 2; n31 indicates an integer of from 1 to 10; n32 indicates an integer of from 1 to 5; when 3-m31 or m31 is 2 or more, then $R^{31}$'s or $R^{32}$'s may be the same or different.

14. The organic-inorganic hybrid proton-conductive material of claim 13, wherein the proton source is at least one selected from the group consisting of phosphorus compounds, organic sulfonic acids and perfluorocarbonsulfonic acid polymers.

15. The organic-inorganic hybrid proton-conductive material of claim 13, wherein the organic-inorganic hybrid material further comprises at least one compound of formula (1-4) or a polymer having a repeating unit of the formula (1-5), and wherein the amount of the at least one compound or polymer is in the range of from 1 mol % to 50 mol % relative to the precursor:

  (1-4)

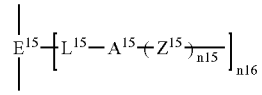  (1-5)

wherein, in formulae (1-4) and (1-5), $A^{14}$ and $A^{15}$ each represents an organic atomic group that contains a mesogen and an alkylene group having at least 4 carbon atoms; $Z^{14}$ and each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

16. A fuel cell that comprises an organic-inorganic hybrid proton-conductive material, wherein the organic-inorganic hybrid proton-conductive material containing a organic-inorganic hybrid material and a proton source which imparts proton conductivity into the organic-inorganic hybrid material, and wherein the organic-inorganic hybrid material is produced by crosslinking a precursor that is an organosilicon compound having a mesogen group.

17. The fuel cell of claim 16, wherein the organic-inorganic hybrid material is produced by three-dimensionally crosslinking the precursor.

18. The fuel cell of claim 16, wherein the proton source is at least one selected from the group consisting of phosphorus compounds, organic sulfonic acids and perfluorocarbonsulfonic acid polymers.

19. The fuel cell of claim 16, wherein the organic-inorganic hybrid material further comprises at least one compound of formula (1-4) or a polymer having a repeating unit of the formula (1-5), and the amount of the at least one compound or polymer is in the range of from 1 mol % to 50 mol % relative to the precursor:

  (1-4)

  (1-5)
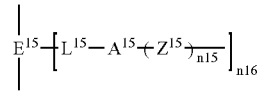

wherein, in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

20. The fuel cell of claim 16, wherein the organic-inorganic hybrid material is produced by polymerizing a compound of the following formula (1-1):

(1-1)

wherein A1 represents an organic atomic group that contains a mesogen group and an alkylene group having at least 4 carbon atoms; $R^{11}$ represents an alkyl group, an aryl group or a heterocyclic group; $X^1$ represents a halogen atom or $OR^{14}$; $R^{14}$ represents a hydrogen atom, an alkyl group, an aryl group or a silyl group; m11 indicates an integer of from 0 to 2; n11 indicates an integer of from 1 to 10; when m11 or 3-m11 is 2 or more, then $R^{11}$'s or $X^1$'s may be the same or different.

21. The fuel cell of claim 20, wherein the proton source is at least one selected from the group consisting of phosphorus compounds, organic sulfonic acids and perfluorocarbonsulfonic acid polymers.

22. The fuel cell of claim 20, wherein the organic-inorganic hybrid material further comprises at least one compound of formula (1-4) or a polymer having a repeating unit of the formula (1-5), and wherein the amount of the at least one compound or polymer is in the range of from 1 mol % to 50 mol % relative to the precusor:

(1-4)

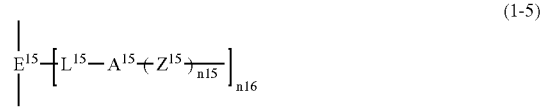

(1-5)

wherein, in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

23. The fuel cell of claim 16, wherein the organic-inorganic hybrid material is produced by three-dimensionally crosslinking a precursor that is an organosilicon compound that has an alkoxysilyl group, a mesogen group and a substituent group capable of forming a carbon-carbon bond or a carbon-oxygen bond through polymerization.

24. The fuel cell of claim 23, wherein the organic-inorganic hybrid material is produced through sol-gel reaction of a precursor that is an organosilicon compound of the following formula (2-1) to form an Si—O—Si bond, combined with polymerization of the substituent in the organosilicon compound to form a carbon-carbon bond or a carbon-oxygen bond:

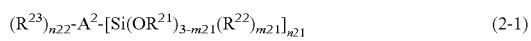

(2-1)

wherein $A^2$ represents an organic atomic group containing a mesogen group; $R^{21}$ represents an alkyl group; $R^{22}$ represents an alkyl group, an aryl group or a heterocyclic group; $R^{23}$ represents a substituent group capable of forming a carbon-carbon bond or a carbon-oxygen bond through polymerization; m21 indicates an integer of from 0 to 2; n21 indicates an integer of from 1 to 10; n22 indicates an integer of from 1 to 5; when 3-m21 or m21 is 2 or more, then $R^{21}$'s or $R^{22}$'s may be the same or different; when n22 is 2 or more, then $R^{23}$'s may be the same or different.

25. The fuel cell of claim 24, wherein the proton source is at least one selected from the group consisting of phosphorus compounds, organic sulfonic acids and perfluorocarbonsulfonic acid polymers.

26. The fuel cell of claim 24, wherein the organic-inorganic hybrid material further comprises at least one compound of formula (1-4) or a polymer having a repeating unit of the formula (1-5), and wherein the amount of the at least one compound or polymer is in the range of from 1 mol % to 50 mol % relative to the precusor:

(1-4)

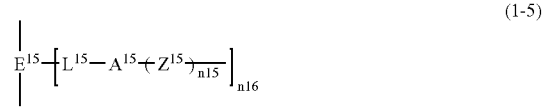

(1-5)

wherein, in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer of from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

27. The fuel cell of claim 16, wherein the organic-inorganic hybrid material is produced though crosslinking polymerization of a precursor that is a polymer having, in the side branches thereof, an atomic group that contains an alkoxysilyl group, a mesogen group and an alkylene group.

28. The fuel cell of claim 27, wherein the organic-inorganic hybrid material is produced by a precursor is a polymer having a repeating unit of the following formula (3-1):

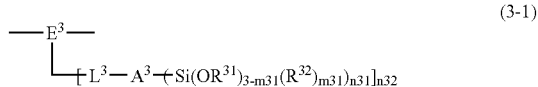

(3-1)

wherein $A^3$ represents an organic atomic group that contains a mesogen group and an alkylene group; $R^{31}$ represents an alkyl group; $R^{32}$ represents an alkyl group, an aryl group or a heterocyclic group; $E^3$ represents an alkyleneoxy group, an alkylene group or a siloxy group; $L^3$ represents a linking group; m31 indicates an integer of from 0 to 2; n31 indicates an integer of from 1 to 10; n32 indicates an integer of from 1 to 5; when 3 -m31 or m31 is 2 or more, then $R^{31}$'s or $R^{32}$'s may be the same or different.

29. The fuel cell of claim 28, wherein the proton source is at least one selected from the group consisting of phosphorus compounds, organic sulfonic acids and perfluorocarbonsulfonic acid polymers.

30. The fuel cell of claim 28, wherein the organic-inorganic hybrid material further comprises at least one compound of formula (1-4) or a polymer having a repeating unit of the formula (1-5), and the amount of the at least one compound or polymer is in the range of from 1 mol % to 50 mol % relative to the precusor:

 (1-4)

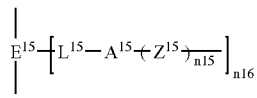 (1-5)

wherein in formulae (1-4) and (1-5), $A^{14}$ and $A^{15}$ each represents an organic atomic group that contains a mesogen and an alkylene group having at least 4 carbon atoms; $Z^{14}$ and $Z^{15}$ each represents a substituent not changing in sol-gel reaction, or a hydrogen atom; n13 and n15 each indicates an integer of from 1 to 8; n14 indicates an integer from 0 to 4; n16 indicates an integer of from 1 to 5; $Y^{14}$ represents a polymerizing group that may form a carbon-carbon bond or a carbon-oxygen bond through polymerization; $L^{15}$ represents a linking group; $E^{15}$ represents an alkyleneoxy group, an alkylene group or a siloxy group; and when n13 or n15 is 2 or more, then $Z^{14}$'s or $Z^{15}$'s may be the same or different.

* * * * *